United States Patent [19]

Eldridge et al.

[11] 3,731,278

[45] May 1, 1973

[54] FORMAT CONVERSION SYSTEM

[75] Inventors: Brice Eldridge, Ramsey, N.J.; Christopher G. Davy, Vienna, Va.; Richard A. Michals, Skokie, Ill.

[73] Assignee: Stenographic Machles, Inc., Skokie, Ill.

[22] Filed: Feb. 9, 1970

[21] Appl. No.: 9,516

[52] U.S. Cl. ....................................340/172.5, 197/9
[51] Int. Cl. ...............................G06f 3/02, B41j 3/26
[58] Field of Search ........................340/172.5; 197/9

[56] References Cited

UNITED STATES PATENTS

| | | | |
|---|---|---|---|
| 2,918,662 | 12/1959 | Cox et al. | 340/172.5 X |
| 3,293,613 | 12/1966 | Gabor | 340/172.5 |
| 3,372,865 | 3/1968 | Pellegrini | 197/9 X |
| 3,428,747 | 2/1969 | Alferieff | 197/9 UX |

*Primary Examiner*—Harvey E. Springborn
*Attorney*—Pendleton, Neuman, Williams and Anderson

[57] ABSTRACT

A computer interfacing device for converting serial input data representing phonetic constructions of words or word parts of the link produced by a shorthand machine into parallel output data is described. The device includes means for accumulating input data which arrives in serial bit by bit form and generating output data in a computer compatible format comprising successive bytes of parallel data bits. Means are included for detecting and correcting errors in the alignment of the output data as it is recorded on magnetic tape, for separating the output data into records and recording a prescribed inter-record gap between records, and for detecting the end of recorded input data and recording a prescribed file gap at the end of the last record.

9 Claims, 19 Drawing Figures

Inventors
Bruce Eldridge
Christopher G. Davy
Richard A. Michals
by: Pendleton, Neuman, Seibold & Williams
Att'ys Inventors
Bryce Eldridge
Christopher G. Davy
Richard A. Nichols
by: Pendleton, Neuman, Seibold & Williams
Att'ys Inventors
Bryce Eldridge
Christopher G. Davy
Richard A. Michals
by: Pendleton, Neuman, Seibold & Williams
Att'ys Inventors
Brice Eldridge
Christopher G. Davy
Richard A. Michals
by: Pendleton, Neuman, Seibold & Williams
Att'ys Inventors
Brice Eldridge
Christopher G. Davy
Richard A. Nichols
by: Pendleton, Neuman
Seibold & Williams
Atty's Inventors
Brice Eldridge
Christopher G. Davy
Richard A. Nichols
by: Pendleton, Neuman, Seibold & Williams
Att'ys Inventors
Brice Eldridge
Christopher G. Davy
Richard A. Michals
by: Pendleton, Neuman, Seibold & Williams
Atty's Inventors
Brice Eldridge
Christopher G. Davy
Richard A. Michals
by: Pendleton, Neuman
Seibold & Williams
Attys Inventors
Brice Eldridge
Christopher G. Davy
Richard A. Nichols
by: Pendleton, Neuman
Seibold & Williams
Atty's Inventors
Brice Eldridge
Christopher G. Davy
Richard A. Nichols
by Pendleton, Neuman, Seibold & Williams
Atty's

| A | B | OUTPUT |
|---|---|---|
| 0 | 0 | 0 |
| 0 | 1 | 0 |
| 1 | 0 | 0 |
| 1 | 1 | 1 |

Inventors
Brice Eldridge
Christopher G. Davy
Richard A. Michals
by: Pendleton, Neuman, Seibold & Williams
Atty's Inventors
Bruce Eldridge
Christopher G Davy
Richard A. Michals
by: Pendleton, Neuman, Seibold & Williams
Att'ys

FORMAT CONVERSION SYSTEM

FIELD OF THE INVENTION

This invention relates to computer associated data input devices and more particularly to a device which accepts data in a form not generally suitable for computer input, and converts it to a computer compatible format defined in accordance with the data handling capabilities of a computer. In the preferred embodiment, the input data represents phonetic constructions of words or word parts of the kind generated by a shorthand machine.

BACKGROUND OF THE INVENTION

Shorthand machines have long been used to quickly and accurately record court proceedings, conferences, and meetings and in business and general communications. One particular kind of shorthand machine has 23 keys. (Throughout this disclosure the term "key" is used in the broad sense to designate any elements of a keyboard used in recording; thus in the particular machine being described, it includes both the 22 character keys and the numeral shift bar on the key board of the shorthand machine.) Each character key represents a character which is a letter of the alphabet or a numeral used to construct in phonetic form words or groups of words in constructing phonetic words or word combinations. Ten of the 22 keys contain both a primary and a secondary phonetic character in a design similar to some of the keys on a typewriter. The primary character is the pattern recorded when a key is depressed; the secondary character is recorded when a key carrying both primary and secondary characters and the numeral shift bar are depressed during the same stroke.

A shorthand record is produced of stroking the keyboard of the machine; a stroke consists f one or more keys of the shorthand machine depressed and subsequently released approximately simultaneously to record the phonetic construction of a word, numeral, a part of a word or other information. The typical machine records each stroke on a paper tape. Such machines have an advantage over the use of shorthand taken by hand in that they allow the machine operator to take dictation at a very high rate for a long period of time without fatigue and with a minimum number of errors.

Because of the great volume of dictation which the operator may take without interruption, a considerable delay may ensue before the official transcription is prepared. Often the transcription is needed immediately, as in continuing court proceedings, and speed in its preparation is always valuable and often vitally important. For this reason, a computer can be used to considerable advantage in the transcribing process.

Computer transcription requires some form of electrical representation of the shorthand information. A shorthand system which produces and records such an electrical representation is disclosed together with a transcription system in the application of Robert T. Wright et al., Ser. No. 689,079 entitled Stenographic Transcription System (now U.S. Pat. No. 3,557,927 issued Jan. 26, 1971).

The most efficient systems for generating and recording electrical shorthand information, including the system of the Wright et al. application, now U.S. Pat. No. 3,557,927 issued Jan. 26, 1971, mentioned above, generally do not generate or record such information in a form which is desirable for subsequent computer transcription. While the machine's electrical output or record may be read into the computer and redefined into a computer compatible format by a suitable subroutine, this process is relatively inefficient. The cost in computer time is considerable with the result that transcription costs are relatively high.

With the present invention, the electrical shorthand signal is converted to a form which is compatible with the computer being used for transcription.

SUMMARY OF THE INVENTION

The invention may be briefly described as a computer interfacing device which converts data in a form similar to that used in phonetic word construction of the kind generated by a shorthand machine into a computer compatible format. A shorthand machine which is particularly useful with the present invention is described in the Wright et al. application, now U.S. Pat. No. 3,557,927 issued Jan. 26, 1971, described above. (In using the term "phonetic word construction" in this application, applicant includes words, parts of words, numerals and other information which are made in the general shorthand form.)

One of the most efficient electrical generating and recording processes for shorthand information utilizes the spatial arrangement of the shorthand keys in the shorthand machine, and carries that arrangement into the corresponding electrical signal. The typical shorthand machine has 23 keys; any one or more of the keys may be depressed in a single "stroke" of the machine.

In generating electrical binary signals indicative of the keys depressed during the stroke, each stroke can be assigned to a particular time interval in the signal and each key can be assigned to a particular sub-interval in the time interval. This technique is similarly applicable to recording such information where spatial intervals and sub-intervals along the recording medium may be used for strokes and keys respectively. The above mentioned Wright et al. application, now U.S. Pat. No. 3,557,927 issued Jan. 26, 1971, employs the concept in signal generation and recording.

The format of the output data generated by an interfacing device constructed according to the present inventor is determined by the computer which is to process the data. A typical computer with which a preferred embodiment of this invention is used is the IBM 360 which accepts input data in groups of 32 data bits = 4 bytes = 1 computer word. Thus the output of the data transfer system of this invention consists of computer words, each computer word including four data bytes or 32 data bits. As discussed in the Wright et al. application, now U.S. Pat. No. 3,557,927 issued Jan. 26, 1971, the depression and subsequent release of a plurality of the keys of the shorthand machine's keyboard generates an electrical output signal containing twenty-three data bits. A 24th dummy bit, is added to the machine output signal to make up the 24 bit data interval which is applied to the interfacing device of this invention. The interfacing device converts the data interval into three 8-bit bytes and adds thereto a fourth 8-bit byte, thereby forming a computer word from each input data interval. The fourth byte, also termed a dummy byte, contains no data from the input data interval; it is therefore available to carry arbitrarily assigned information such as a special code assignment so that more than one data transfer system may be multiplexed on the same output device.

One computer specifically an IBM 360–65, with which the preferred embodiment of the invention used requires that the input data be divided into records of a specified length; therefore, for the purpose of describing a particular embodiment of the invention, the length of a data record is chosen to be 3,072 bytes. In order to divide the output data into records, the interfacing device of this invention counts the number of data bytes sent to the output device. The output data is applied directly to the computer input for processing. In the exemplary embodiment described herein, the output device disclosed is an incremental tape recorder such as the Peripheral Equipment Corporation, Model 1805-9, which records the data on standard magnetic tape of the type normally used with computer input devices. When the count maintained by the interfacing device reaches the number specified (herein 3072) an Inter-Record Gap of specified length is inserted in the data output record being put on the magnetic output tape by the interfacing device. Intervals of input data continue to arrive at the interfacing device during the period the gap is recorded; therefore, storage means are provided for accumulating the resulting output data until the gap terminates and the accumulated data is forwarded to the output tape.

Error checking and correcting means are provided to check the alignment of the data in each recorded computer word. Each interval of input data supplied to the data transfer system disclosed herein includes twenty-four data bits. Correct alignment of a computer word of output data exists only if the first three bytes of the computer word contain all the data included in an interval of input data; the fourth byte must be the dummy byte. If one or more data bits are lost resulting in incorrect alignment of the output data, this error is detected by the error checking means. A data bit is available for error marking purposes due to the fact that a dummy data bit is added to each 23-bit machine output signal to form the required 24-bit input data interval. The state of this data bit may be defined as either zero or one; the state is changed by the Error Checking means to mark the error in the previous computer word. Upon an error being detected, no further data is forwarded to the output device until correctly aligned data is again generated by the data transfer system.

Means are also provided for detecting the end of serial data input, and for suspending the operation of the interfacing device, thereby dividing the output data into files. Each file consists of all the input data sent, without interruption, from the data source to the interfacing device. A single file may contain all the data generated by a shorthand machine in recording a single proceeding. An end of data signal is also sent to the output device upon reaching the end of recorded input data.

GENERAL SYSTEM DESCRIPTION

Figures 1, 2:
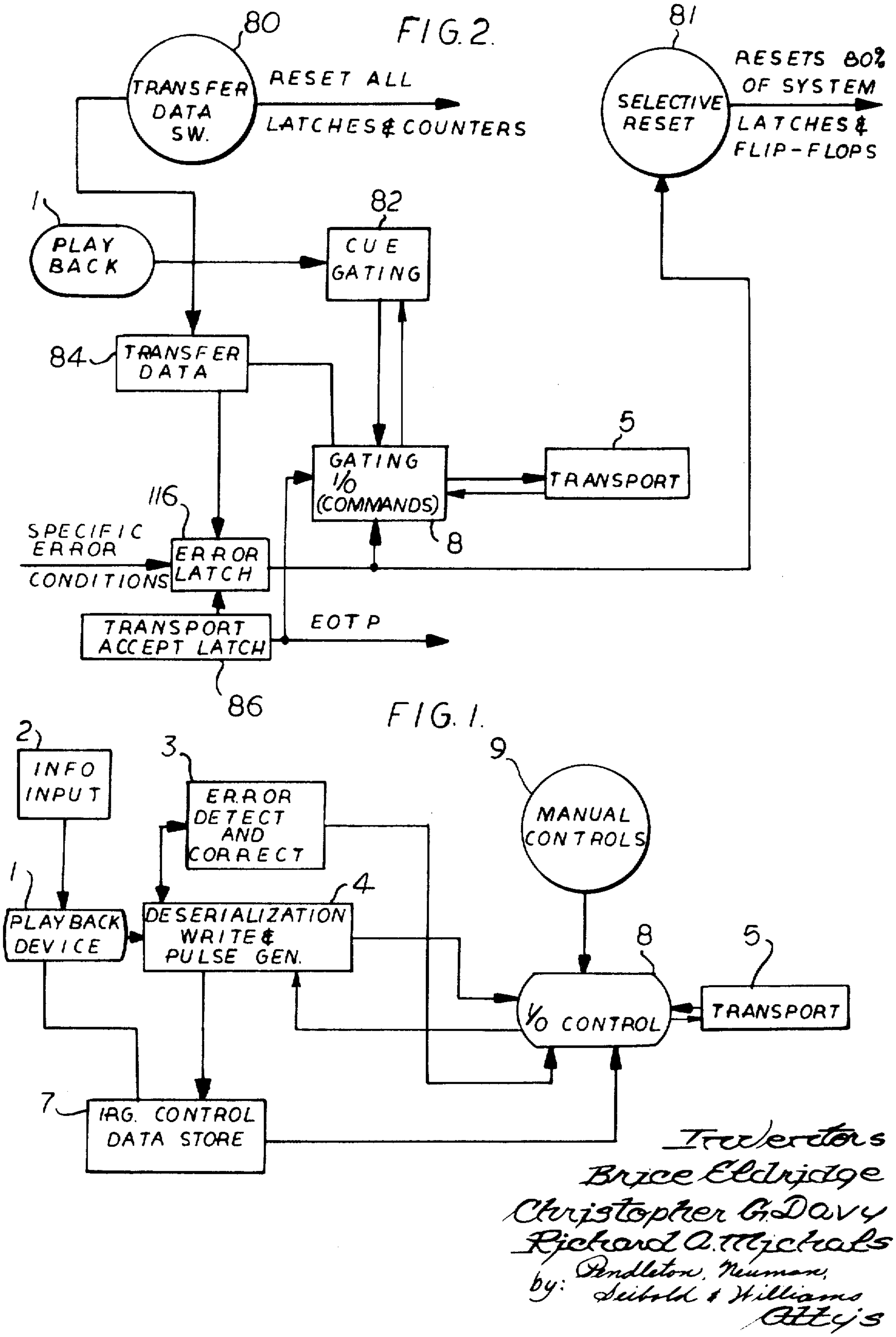
FIG. 1 is a block diagram illustrating the general operating functions of the complete interfacing device of this invention.
FIG. 2 is a block diagram more detailed than FIG. 1 depicting basic input/output controls and the manual reset switches of the interfacing device.

Referring to FIG. 1 the basic components of a data transfer system used in a preferred embodiment of this invention are shown in block diagram form.

By way of example, the playback device 1 is a source of binary data in serial form. The binary data is a series of intervals of data pulses, each interval being divided into subintervals by a series of spaced timing pulses. The data pulses to be transferred are associated with the timing pulses. The data pulses are in binary form, and a single data pulse is associated with the subinterval defined by each timing pulse.

In the specific embodiment disclosed herein the playback device 1 is a multi-track tape machine used in combination with a shorthand machine as disclosed by R. Wright et al. in application, Ser. No. 689,079, now U.S. Pat. No. 3,557,927 issued Jan. 26, 1971, and assigned to the assignee of the present invention. The shorthand machine, designated as "Info Input 2" in FIG. 1, has a keyboard comprising 23 keys. In using the machine, an operator strokes one or more keys of the machine simultaneously to record a word, a numeral, or part of a word.

A switch is associated with each key of the machine to enable the machine to produce an electrical binary output signal in addition to the conventional paper tape printing. The binary output signal generated by each stroke comprises a plurality of binary bits indicating which keys have or have not been depressed. Thus, the binary signal referred to herein as a data interval, associated with each stroke, contains a fixed number of binary bits, or subintervals, one for each key of the machine.

The shorthand machine output is recorded on a magnetic recording tape which is read back by the playback device 1. The magnetic tape keeps an electrical record of the keys which make up each stroke. Each stroke is assigned a spatial interval along the recording tape and each key is assigned a subinterval within the spatial interval. A binary one data bit is inserted in each subinterval assigned to a key depressed in making the stroke; a binary zero data bit is inserted in the subinterval assigned to each key that is not depressed. Each subinterval also includes a timing pulse which aids subsequent processing of the information. Thus each interval of timing pulses and associated data bits is a record of a single stroke on the shorthand machine. In the embodiment described, these intervals are read back serially by the playback device 1.

The data transfer system functions as a computer interfacing device i.e., it converts the input data from the playback 1 to output data having a special format designed for computer operation.

The device disclosed herein converts each interval of input data to a "word" of output data in a computer compatible format; each word of output data contains the information from a single input data interval. In the exemplary embodiment of this invention, a data interval includes 24 timing pulses and data bits; with suitable modification any data interval including a multiple of eight data bits is converted to a computer compatible format by this device. Each of 23 timing pulses defines a subinterval associated with a specific key on the keyboard of the shorthand machine. The 24th timing pulse has no associated key, and the binary data bit of this subinterval is arbitrarily defined as being zero for use in the Alignment Error Checking Section 3 described below.

Each interval of timing and data pulses is applied to the input of the deserialization and write pulse generation means 4. Each 24-bit data interval is deserialized into a set of three bytes each including eight data bits by deserialization means 4. A dummy byte consisting of eight zeroes is also added to each set of 3 data bytes by the deserialization means 4. Thus 4 bytes of output data are transferred to the computer for each three received. This is to provide 32-bit words instead of 24-bit words to the computer. (In FIG. 1, the elements 4, 7 and 8 are modules obtainable from Raytheon Computer, Santa Ana, California; they are respectively models MSR-1, MFF-40, and MGD-1 described respectively in Raythenon Computer Bulletin SP230-4 of Dec. 1967, SP230-12 of Sept. 1967 and SP230-58 of Oct. 1967.)

A typical computer with which the interfacing device of this invention is used is the IBM 360 computer. The memory of the computer is logically composed of 32-bit words, and thus recording the parallel output data in 32-bit word form simplifies data handling within the computer itself.

An incremental tape transport 5 is used to record the output data on standard magnetic computer tape. As each 32-bit word is accumulated by the deserialization means 4, write pulses are generated and sent to the transport 5 by Write Pulse means 4, ordering the recording of the word on the tape. A typical recorder which may be used is the Peripheral Equipment Corporation Model 1805-9. Data applied to the input of the tape recorder 5 is recorded on the tape only upon receipt by the recorder 5 of a write command pulse.

The processing of a single complete tape of input data as supplied by a tape from a recorder such as that described in the application of Robert T. Wright, et al. in application, Ser. No. 689,079, now U.S. Pat. No. 3,557,927 issued Jan. 26, 1971, produces approximately 30 "records" of output data on the output tape. A record is defined in this particular embodiment of the invention as consisting of 3,072 bytes. The computer format for which this specific data transfer device is designed requires an Inter-Record Gap (also referred to hereafter as IRG) of a specified duration between each of the records produced on the output tape. The transport 5 has the necessary internal circuitry to record the gap; it is recorded upon receipt by the transport of an IRG command signal from the data transfer device. The signal to the transport 5 to generate and record the Inter-Record Gap is provided by IRG control 7, FIG. 1.

No data is recorded during the recording of the Inter-Record Gap. Since input data is continuous, and continues to arrive at deserialization means 4 while this Inter-Record Gap is being recorded, Data Storage means are a part of the IRG feature. The IRG control 7 also has a playback unit motor speed control device which controls the speed of tape playback 1, and acts to slow the speed of the playback unit during the recording of the Inter-Record Gap; this slows the rate of data input and lessens the amount of data which must be stored by the Data Storage means.

A "file gap," as defined herein, is a magnetic mark on the output tape which indicates to the data processing computer the end of all data information transferred from a single tape of the playback device 1. The data input from the tape of the playback device 1 is processed continuously until a predetermined length of blank tape having no timing pulses is detected. Once this blank space is detected, the Input/Output Control means 8 transmits a file gap command to Transport 5 causing a recorded file gap, resets all the internal logic of the data transfer device, and locks out any further data input until initial conditions are restored through use of Manual Control means 9.

The illustrated embodiment of the invention further has Alignment Error Detection and Correction means 3 which cooperate with the Input/Output Control 8 to detect errors in the incoming data from the playback device 1. If an error occurs during deserialization, Alignment Error Detection means 3 inhibits Output means 8 so that no erroneous data is thereafter recorded on the tape. The Output means 8 remains inhibited until the Alignment Error Correction means 3 detects properly deserialized data in the Deserialization means 4. Any erroneous data which may have been recorded on the output tape prior to detection of the error is marked for detection by the computer. The shorthand machine which serves as the Information Input device 2 in combination with this invention has only 23 keys and the first subinterval of each 24 pulse data interval carries no information; thus an error marking data bit may be inserted in this subinterval to mark an erroneous word of output data. The Alignment Error Detection and Correction Operation is described more fully below.

Manual controls 9 are provided for overall control of the data transfer device. The controls also allow manually generated data to be inserted, and provide for isolated operation of the various components of the device for testing purposes.

The major components of the data transfer device of this invention are broadly described above in conjunction with the block diagram of FIG. 1. The interrelationship of the major components is described with reference to the block diagrams and timing charts appearing in FIG. 2 through FIG. 9; a detailed logic diagram of an operative system constructed in accordance with this invention is shown in FIG. 10A through 10D.

DESERIALIZATION AND WRITE PULSE GENERATION

Figures 3, 4:
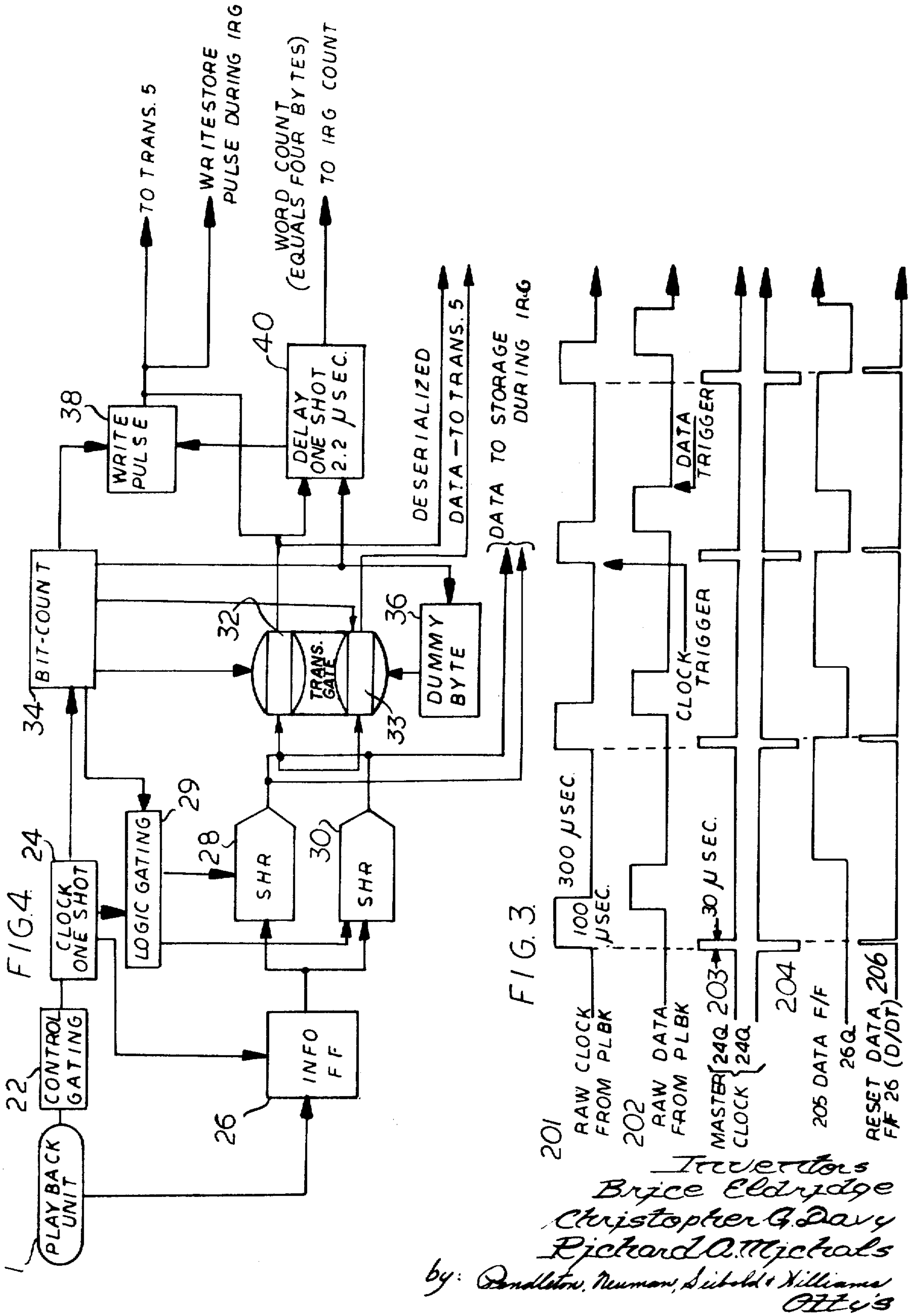
FIG. 3 is a timing chart illustrating the relationship of the timing and data input pulses, and the system clock pulses.
FIG. 4 is a block diagram more detailed than FIG. 1 illustrating means for deserializing the input data and generating write command pulses, including means for data storage and data transfer to the output device.

FIG. 4 shows, in block diagram form, the means for deserialization of the input data into the desired output format, and for generation of the write pulse commands to be sent to the transport 5 to order the output data recorded. FIG. 3 is a timing diagram illustrating the relation in time of the clock and data pulses as they flow through the deserialization means to the Shift Registers 28, 30. The logic circuitry of this section is shown in detail in FIG. 10A.

A preferred recording system operates as follows: the input data to the deserialization and write pulse generation means exists as intervals of 24 timing pulses, each interval having a period of about 10 milliseconds (hereafter abbreviated msec.), followed by a blank space of about 4 msec. duration. The actual time period of the data interval varies with the speed of the playback device 1. The times shown in the timing diagram of FIG. 3 are for high speed operation of the tape of the playback device 1, which is about 7 inches per second. The input timing and data pulses themselves, shown at lines 201, 202, of FIG. 3, are 100 microseconds (hereafter abbreviated $\mu$secs.) in duration, with about 300 $\mu$secs. between each pulse. Direct data input from Information Input device 2 without the intervening steps of recording and playback is also possible without substantial modification of the information input device 2 disclosed herein.

The rate of data input can be varied considerably, depending on the data input source used, without disruption of the internal analysis of the data because each interval of input data arrives in conjunction with its own timing pulses. The data transfer device is designed to derive all its timing from the arrival of timing pulses of a given frequency. With respect to the relative timing of the input timing pulses shown at line 201 of FIG. 3, and the input information or data pulses shown at line 202, the binary data pulse comes first, if one exists, followed on the other channel by the associated timing pulse which defines each subinterval of the data interval. In the illustrative example shown in FIG. 3, the first data bit of the input data interval is a zero and thus it does not appear on line 202. The remainder of line 202, by way of example, shows four consecutive data pulses.

The leading edge of each timing pulse of the interval of input data passes via input control gating 22 to the trigger input of clock one shot 24. The output pulses of this conventional one shot multivibrator have a period of 30 microseconds and are the master clock pulses which control the timing of the interrelated circuits of this interfacing device; hereafter in this disclosure the clock pulses referred to are these 30 λsec. pulses. The input and output of the master clock pulse generator 24 are shown at lines 201, 203, 204 of the timing chart of FIG. 3. As shown, the one shot 24 generates two outputs, one positive, the other negative.

Each input data pulse from the playback unit 1 is applied to the input of information flip-flop 26. Flip-flop 26 applies the input data pulse to either of two shift registers 28, 30, FIG. 4. Each shift register has a capacity of eight data bits. Two shift registers are required so that one is available to record and store input data during the time period that the other is sending deserialized output data to transport 5. The clock pulse output of one shot 24 is used to shift the binary data bits through the shift registers 28, 30. The trailing edge of the clock pulse is also used to reset the information flip-flop 26, preparing it to receive the next data pulse. The bit count device 34 controls the shift registers 28, 30 and determines which register stores the input data pulses. The control is accomplished by directing the clock pulses to one of the shift registers 28, 30, through the logic gating 29.

Because the transport 5 (FIG. 1) records 8 data bits or one data byte at a time, and the shift registers 28, 30 have an 8 bit capacity, output data is transferred to the transport 5 by alternate shift registers. Each eight bit shift register 28, 30 has a separate associated transfer gate 32, 33. During the time period that one shift register is accepting information, the other is transferring data through its associated transfer gate to transport 5.

Bit Count 34 controls which shift register is to accept information and which is to transfer it through its associated transfer gate to the transport. For example, in recording a typical stroke of 24 input data bits, after shift register 28 receives and stores the first eight data bits which make up a stroke, the bit count 34 disables register 28 from receiving input data, enables the transfer gate 32 associated with register 28 to transfer the deserialized data in register 28 to the transport 5, and enables shift register 30 to receive and store the succeeding data input bits from information flip-flop 26.

The Bit Count 34 also controls Write Pulse one shot 38. The output of this one shot multivibrator 38 is a command pulse to transport 5 to accept and record the output data sent by the transfer gates 32, 33. In this example, having enabled transfer gate 32 to transfer output data to the transport, the bit count triggers a command pulse from write one shot 38, thereby recording the transferred data.

Continuing the example, when the second byte of 8 data input bits has been received and stored by register 30, shift register 28 is again enabled to accept input data information, and transfer gate 33 is commanded to transfer the data now stored in register 30 to transport 5. A second write step pulse is also triggered from one shot 38, recording the second data byte. The same sequence as that for transferring the first 8 bits recorded from register 28 via transfer gate 32 is repeated for the last 8 bits of the stroke, and a third write pulse is issued by one shot 38 to the transport, recording the third byte.

As is explained above, computer memory storage is in groups of 32 bits = 4 bytes = 1 word; therefore it is both necessary and highly useful in later application to add a dummy byte consisting of eight dummy data bits to each incoming data interval of 24 associated timing pulses and data bits.

When three data bytes have been accumulated from an interval of input data, the bit count 34 has a count of 24. An output signal from the bit count 34 indicating this count sets the dummy byte flip-flop 36, and is combined with the third write pulse from one shot 38 to trigger the delay one shot multivibrator 40. The delay one shot 40 is used to trigger the write pulse one shot 38 after a proper delay to allow for recording of the third byte of output data information bits by the transport. Because the transport 5 records data at 500 bytes per second, or at 2 msec. intervals, delay one shot 40 triggers write one shot 38 only after a delay of greater than 2 msec. In this exemplary embodiment, the delay is established as 2.2 msec. The dummy byte flip-flop 36 is used to inhibit both sets of transfer gates 32, 33 at this time so that at the time that the fourth write pulse is sent to the transport by multivibrator 38 no output data is sent with it, and a byte of 8 dummy data bits is recorded by the transport. In the exemplary embodiment disclosed herein, each of the 8 dummy data bits has a value of zero; that is to say, that the dummy data bits are recorded on the tape as binary zeros with the same magnetic flux patterns as all other binary zeros recorded on the tape. With suitable modification special coded information may be assigned to these data bits, e.g., an identification code for multiplexing purposes.

Figure 10A:
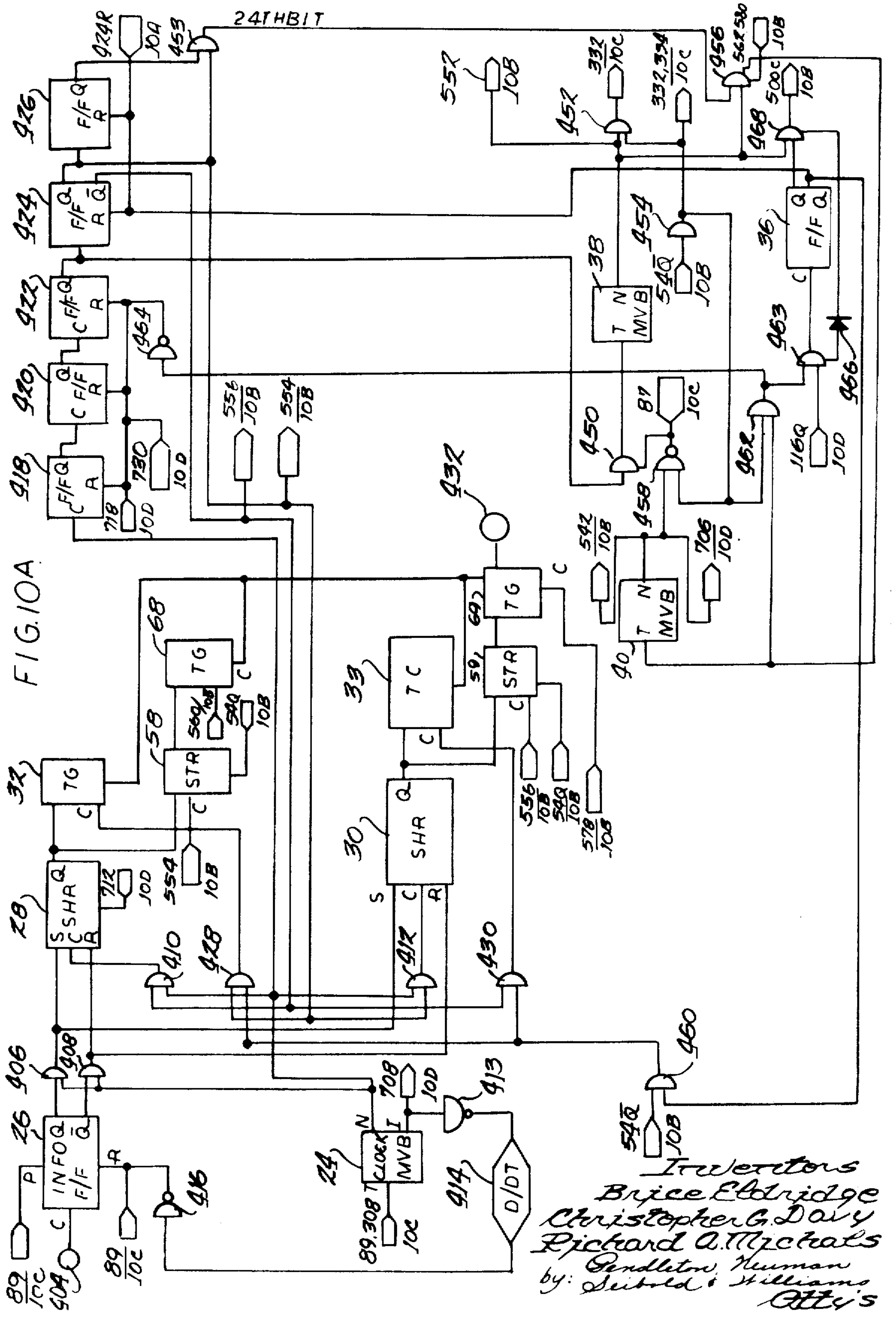
FIGS. 10A – 10D taken together comprise a detailed logic diagram of the interfacing device of this invention.
Figure 11:
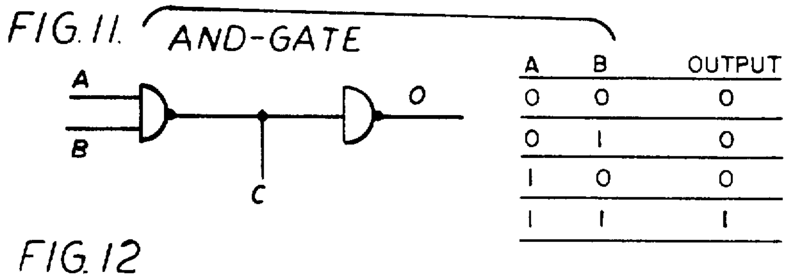
FIG. 11 depicts an AND-gate of the type used in this invention.

Referring to FIG. 10A, the gates shown without an inverter, that is, without a circle at the output, are a combination of two NAND-gates connected as shown in FIG. 11. The gates shown with an inverter are conventional NAND-gates.

The inputs to all gates have current sink logic; that is, if they are at a high or logical one status, then connecting the input of a gate to an output normally at logical zero sinks that input to logical zero. Considering any group of connected gate inputs and outputs, if one output goes to logical zero, or low, then all connected inputs and outputs go to logical zero also (regardless of what they may be otherwise driven to).

In describing this logic diagram, the terms "one" and "high" are equivalent and are used interchangeably; the terms "low" and "zero" are also used interchangeably. Arrows are used to represent connections between the four sections of FIG. 10. The arrow indicates the direction of signal travel.

Referring to the logic diagram of FIG. 10A and more specifically to those parts thereof directed to deserialization and write pulse generation, it may be seen that the timing pulses which define the subintervals of each interval of input data are applied as trigger pulses to the trigger (T) input of clock one shot 24, a conventional monostable multivibrator. A multivibrator found suitable is type MOS1 made by Raytheon. This type of multivibrator has both normal (Q) and inverted ($\bar{Q}$) outputs. The trailing edge of the input pulse triggers the normal output of one shot 24 to a logical one for a time interval or "time" of 30 microseconds. At the end of this time the multivibrator triggers back to a quiescent, logic zero state. All of the one shot multivibrators of this embodiment are of this design; Only the time of the output pulse differs. The input clock pulses are applied via playback connecting line 402 and applied through gate 308. (FIG. 10C.)

The input data pulses from tape playback 11 are applied via playback connecting line 404, FIG. 10A, to the clock (C) input of information flip-flop 26, a flip-flop element consisting of two flip-flops wired as a master-slave combination. The flip-flop is a Raytheon model MFF-3 which can be obtained from Raytheon Computer, Santa Ana, California (see, e.g., Aug. 1968 catalog). The flip-flop has five inputs: preset (P), clocked set, clocked reset, reset (R), and clock (C); the flip-flop has set (Q) and reset ($\bar{Q}$) outputs. The master flip-flop accepts input data when a pulse is applied to the clock input; the data is transferred to the slave flip-flop when the clock pulse ends. A low signal at the reset (R) input forces the set output of the flip-flop to a low state, regardless of the state of the clocked inputs. Internally, the set (Q) output is connected to the clocked reset input. The reset output ($\bar{Q}$) is connected to the clocked set input. Such a configuration causes the flip-flop to "toggle" on the trailing edge of any clock pulse. By "toggle" it is meant that the states of the outputs interchange from their state before toggling. In the schematic of FIGS. 10A through 10D, only the preset, set, and clock inputs are shown; the clocked set and clocked reset inputs are omitted, as the only connections thereto are as described above.

The set output of information flip-flop 26 is connected to an input of AND-gate 406; the clock pulses are applied to the other input, and the output of gate 406 is applied to the set input of shift registers 28, 30. The reset output of flip-flop 26 is combined with the clock pulse output of one shot 24 by AND-gate 408 and applied to the reset gates of the same two shift registers. The binary data input pulses are applied in this manner to the set and reset gates respectively of the shift registers 28, 30; only one shift register is enabled to accept each data pulse, in a manner explained below. Each data pulse is shifted through the register which accepts it by a clock pulse output from one shot 24 triggered by its associated timing pulse from the playback unit 1, FIG. 1. The clock pulses are applied to the clock input of the shift registers via AND-gate 410, 412, respectively, and function as shift pulses for inserting the input data bits into the shift registers 28, 30. At any time only one of AND-gate 410, 412 is open to pass clock pulses to the shift registers' clock input; the state of the AND-gates thus determines which shift register shall accept the input data bits.

Figure 13:
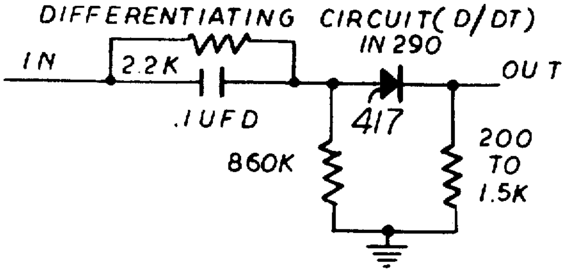
FIG. 13 depicts a differentiating circuit used in this invention.

The data flip-flop 26 is reset to accept the next data bit by the trailing edge of the same clock pulse which is used as a shift pulse, applied through inverter 413, differentiator 414 and inverter 416 to the reset input of flip-flop 26. The differentiator is of conventional design as shown in FIG. 13, and includes diode 417 so that only positive going pulses reach the inverter 416, which will invert the pulse that resets the flip-flop 26.

The resetting of flip-flop 26 does not affect the transfer of data to the shift registers, which accept the close out data on the trailing edge of the same clock pulse, due to the propagation delay from the clock multivibrator 24 to the various gates involved: 70 nanoseconds from clock to shift register, as opposed to 145 nanoseconds from clock to flip-flop 26 reset.

The decision as to which shift register is accepting data at any given time is governed by the bit counter of flip-flops 418, 420, 422, 424 and 426. (The bit counter is 34 in FIG. 4) The bit count counts the number of input data bits received in each interval of input data by counting the timing pulses which define the subintervals. Each timing pulse is applied to the input of clock pulse one shot 24 to trigger a clock pulse output; therefore the clock pulse output of one shot multivibrator 24 is used as the input to the bit count 34. The bit count must be capable of a count of 24, which is the number of timing pulses and data bits in each interval of input data.

The state of flip-flop 424 of the bit count determines which shift register shall accept the input data. The reset output of flip-flop 424, which is connected to AND-gate 410, remains high until the bit count reaches eight, holding gate 410 open. During this time shift pulses are applied to the clock input of register 28 via gate 410 and the input data bits are stored therein. At the same time the set output of flip-flop 424 is low; this output is connected to AND-gate 412 and holds this gate closed, preventing any shift pulses from reaching the clock input of shift register 30, and thus preventing any data from being stored therein.

When 8 data bits have been stored in shift register 28, the state of flip-flop 424 changes, closing gate 410 and opening gate 412. The next eight data input pulses are stored in shift register 30. At the time that the input data pulses are being stored in register 30, the high output from the set side of flip-flop 424 generates a high signal from normally open AND-gate 428, the control gate for transfer gate 32.

Figure 12:
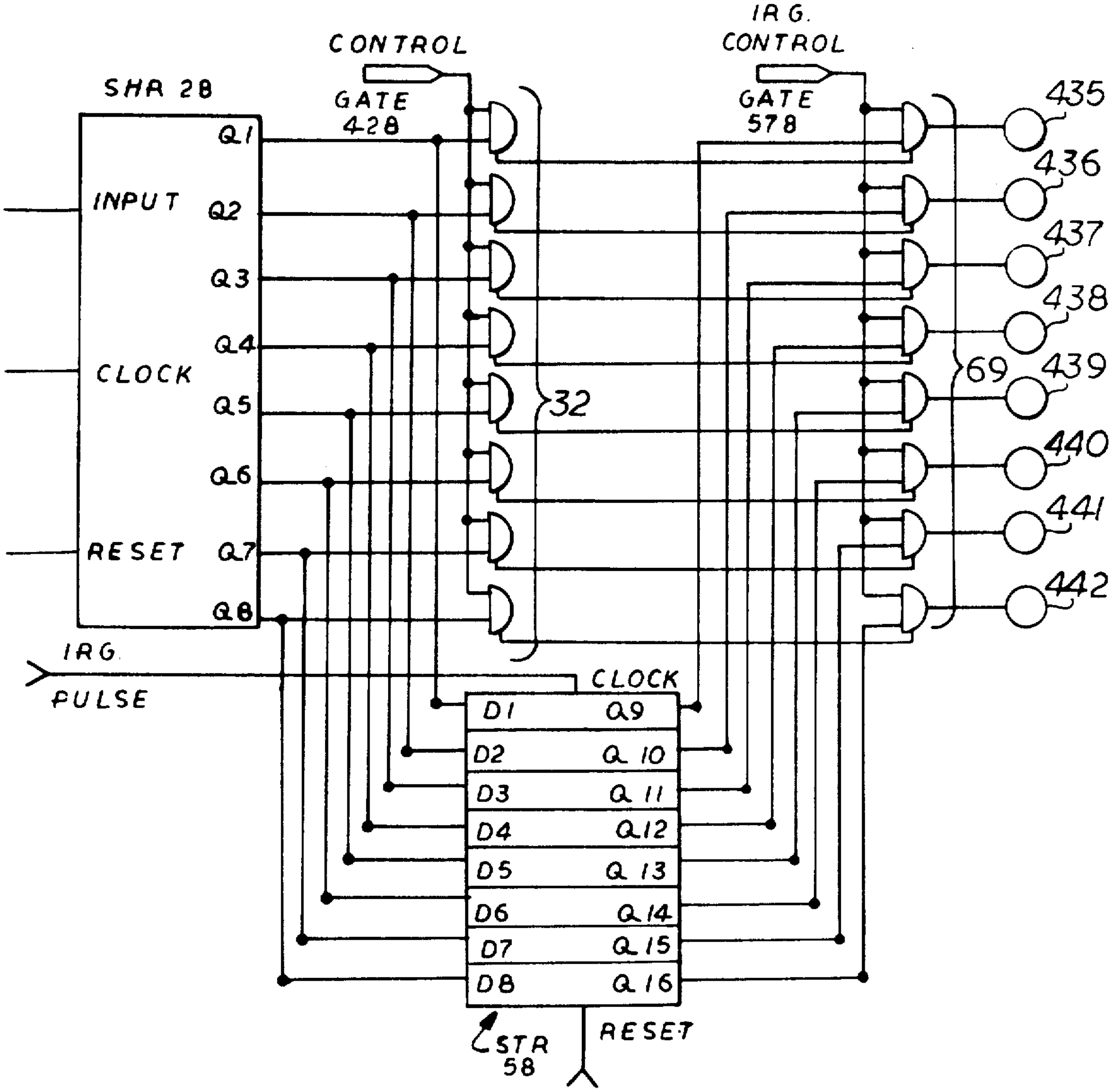
FIG. 12 illustrates in detail the connections between a shift register and its associated storage register and transfer gate, depicted in FIG. 10A.

As shown in detail in FIG. 12, the transfer gate 32 is a series of AND-gates, each AND-gate having one input tied to an output of the associated shift register 28 and the other input tied to a control gate 428. The center pin of each AND-gate of transfer gate 32 is tied to the center pin of the appropriate gate of output transfer gate 69. The individual data lines, 435 through 442, to the transport, are tied to the outputs of appropriate gates of transfer gate 69. Thus if any of the AND-gates whose center pins are connected is turned on, the appropriate output line will be driven high, presenting a logical one to the transport 5 to be recorded by the next write pulse generated.

Also shown in FIG. 12, are the AND-gates of transfer gate 33 similarly connected to transfer gate 69. Moreover, the outputs of two storage registers 58 and 59, both of which are employed in the Inter-Record Gap operation as explained below, are also connected to the transfer gate 69. The connection of register 58 to transfer gate 69 is made through gate 68.

Following the storage of the next eight data bits in shift register 30, controlling flip-flop 424 again changes state, closing gate 412 and opening gate 410, thereby applying the input data to shift register 28. At the same time flip-flop 424 applies a high signal to the control gate of transfer gate 33 via normally open gate 430, transferring the data in shift register 30 to transport connecting cable 432 via transfer gates 33 and 69.

The third data byte is stored in shift register 28 and transferred to transport 5 in the same manner as the first data byte.

The write pulses are generated by write pulse one shot 38, a one shot multivibrator which is triggered by the trailing edge (high-low transition) of a signal applied to its trigger input. The set output of Bit Count flip-flop 422 (which counts 4) is coupled to the trigger input of one shot 38 via driver gate 450. The flip-flop 422 is reset when the bit count reaches a count of eight, triggering a 50 $\mu$sec. pulse from one shot 38 which is applied as a write command pulse to the transport by AND-gate 452, which is normally held open by the output of gate 454.

Thus at the same time that transfer gate 32 transfers the data in shift register 28 to the transport, (i.e., following the storage of 8 data bits in the shift register) a write command pulse is also sent to the transport to order the recording of the output data.

In a similar manner, when the next eight data bits are stored in shift register 30, flip-flop 422 again changes from a set to a reset state, applying a second high-low transition pulse to the input of one shot 38, triggering a second write pulse. This pulse writes the second data byte, transferred from shift register 30, on the tape of transport 5. The third write command pulse is generated in the same manner as the first two, and writes the third data byte on the output tape.

In this exemplary embodiment, an interval of input data includes 24 data bits. Thus the means described above function to store and record 3 bytes of output data at the transport for each stroke of input data. The means for generating the fourth write pulse command to write a dummy byte on the output tape of the transport to form a complete 4-byte 32-bit word, will now be explained in detail. The twenty-fourth clock pulse, as generated by each interval of input timing pulses, is detected by AND-gate 453 whose inputs are from the set side of flip-flop 424 (which changes on count to 8), and flip-flop 426 (which changes on count to 16). The high output signal from gate 453 is applied to AND-gate 456 together with the output of write pulse one shot 38. The third write pulse from one shot 38 combines with the 24th bit indicating signal from gate 453 to generate a high output signal from gate 456 of 50 microsecond duration (the duration of the output from one shot 38). The trailing edge of this signal triggers delay one shot 40, a one shot multivibrator having an output pulse with a 2.2 millisecond time interval. Delay one shot 40 is triggered, rather than triggering write command one shot 38 directly, to provide a time lag between the arrival at the transport of the third and fourth write pulses, as well as to allow one shot 38 time to recover from the previous pulse cycle. The trailing edge of the output delay pulse, applied to the input of write one shot 38 via normally open NAND-gate 458 and the center pin of AND-gate 450 (inverting the signal), triggers the fourth write pulse from one shot 38.

The high output signal of AND-gate 456 is applied to the clock input of dummy word flip-flop 36 via normally open AND-gates 462 and 463. The reset output of flip-flop 36 is forced low by the trailing edge of this pulse. The low signal from this output is applied via AND-gate 460 to gates 428, 430, thereby inhibiting any transfer of data to the transport via transfer gates 32, 33, and insuring that the byte recorded by the fourth, dummy, write pulse consists of eight zeroes. The same low signal from the reset side of flip-flop 36 resets bit count flip-flops 424, 426, so that they are prepared to count the incoming data and timing pulses of the next stroke.

Flip-flops 418, 420, 422 are reset by the trigger pulse to delay one shot 40. The pulse is applied to the reset inputs of these flip-flops by normally open AND-gate 462 and inverter 464.

RECORDING INTER-RECORD GAP

The computer associated with the interfacing device of this embodiment, an IBM 360, requires that the input data be blocked in records. A gap of approximately 1 ½ inches, requiring 60 milliseconds of recording time, must appear between each record. In order to fulfill this requirement without introducing unnecessary complications into the logic system, the length of each record produced by the interfacing device of this invention is defined as 3,072 bytes. The output tape transport 5 is of a design having the necessary internal circuitry to put a standard IBM Inter-Record Gap on the computer tape; the data transfer device must generate the necessary command signal to the transport to activate this circuitry. To generate the signal at the proper time, means must be provided in the data transfer device of this invention for counting the number of bytes written on the computer tape. During the time the Inter-Record Gap (or IRG as it is hereafter abbreviated) is being processed by the transport 5, no new output data may be sent to the transport. Therefore, means must also be provided in the data transfer system for storing the input data which arrives while the Inter-Record Gap is being processed by the transport, then transferring the stored and deserialized output data to the transport, and then returning the data transfer device to normal operation. The means for recording the Inter-Record Gap are described with reference to the block diagram of FIG. 8 and the timing diagram of FIG. 9. In analyzing the timing diagram, note that pulses 3, 4 of line 211, the write command pulses, occur during the normal operational sequence; pulses 1, 2 occur during the IRG sequence. An exemplary specific embodiment will also be fully explained with reference to the detailed logic diagram of FIG. 10B.

The timing for the process of recording the Inter-Record Gap is provided by IRG count 50. As is pointed out above, each record of output data on the computer tape of transport 5 consists of 3,072 bytes. However, the actual count by the flip-flops of the IRG count 50 is 768, since the pulses being counted are word indicating pulses (one word = 4 bytes) which are generated by the combined output of write pulse one shot 38 and dummy byte flip-flop 36, whose functions are disclosed above.

To simplify the data storage process, and reduce the amount of storage space required during recording of the Inter-Record Gap, the rate of data input to the data transfer device is reduced by sending a command signal to the playback unit 1 via motor speed control latch 52. Speed control latch 52 is set when the IRG count 50 equals 2,816 bytes or 704 words. The count of 2,816 is reached approximately two seconds before a command signal to start the Inter-Record Gap sequence is issued. The resulting command signal to playback unit 1 causes the speed of the playback unit to drop from the normal seven inches per second to one inch per second. Motor speed control latch 52 remains set throughout the IRG sequence; upon completion of the sequence, the latch is reset and normal speed of playback unit 1 is resumed.

When the IRG count 50 reaches a count of 768, which is equal to a byte count of 3,072, then IRG latch 54 is set. The high signal from the set output of flip-flop 54 is combined, in the inhibit logic 55, with the write pulse output of one shot 38 to trigger the IRG write one shot 56. The output of this one shot multivibrator 56, a 150 microsecond pulse, is the IRG command pulse to the transport 5 to enter an Inter-Record Gap on the computer tape. Since no data may be recorded during the time the Inter-Record Gap is processed, a low signal from the reset side of IRG latch 54 activates the write pulse inhibit logic 55 to prevent any pulse command output of write pulse one shot 38 from reaching the transport.

Each pulse generated by write pulse one shot 38 during IRG processing becomes a storage control pulse which controls storage logic gating 57. These pulses appear at lines 214, 215 of the timing chart of FIG. 9. The storage logic gating prevents the input data applied to shift registers 28, 30 during IRG processing from being transferred to transport 5. As each shift register accumulates a byte of 8 data bits, the data is shifted in response to the generation of a write pulse by write one shot 38 to associated storage registers 58, 59 under control of the storage gating 57. Write and Store Count flip-flops 60 maintain a count of the number of write pulses used as storage pulses during the period of the Inter-Record Gap; this counting process appears at lines 218, 219 of FIG. 9. Due to the slow speed of the playback mechanism only two write step pulses are generated by write one shot 38 and used as storage pulses during the Inter-Record Gap period. This appears at lines 211, 214 and 215 of FIG. 9.

The Inter-Record Gap having been recorded on the computer tape, the Data Read Logic Gating 62, responsive to the state of Write and Store Count 60 writes the data stored in storage registers 58, 59 during the Inter-Record Gap onto the output tape. IRG write one shot 56, provides the write pulses which are necessary to command the transport to write the output data onto the computer tape.

Figure 9:
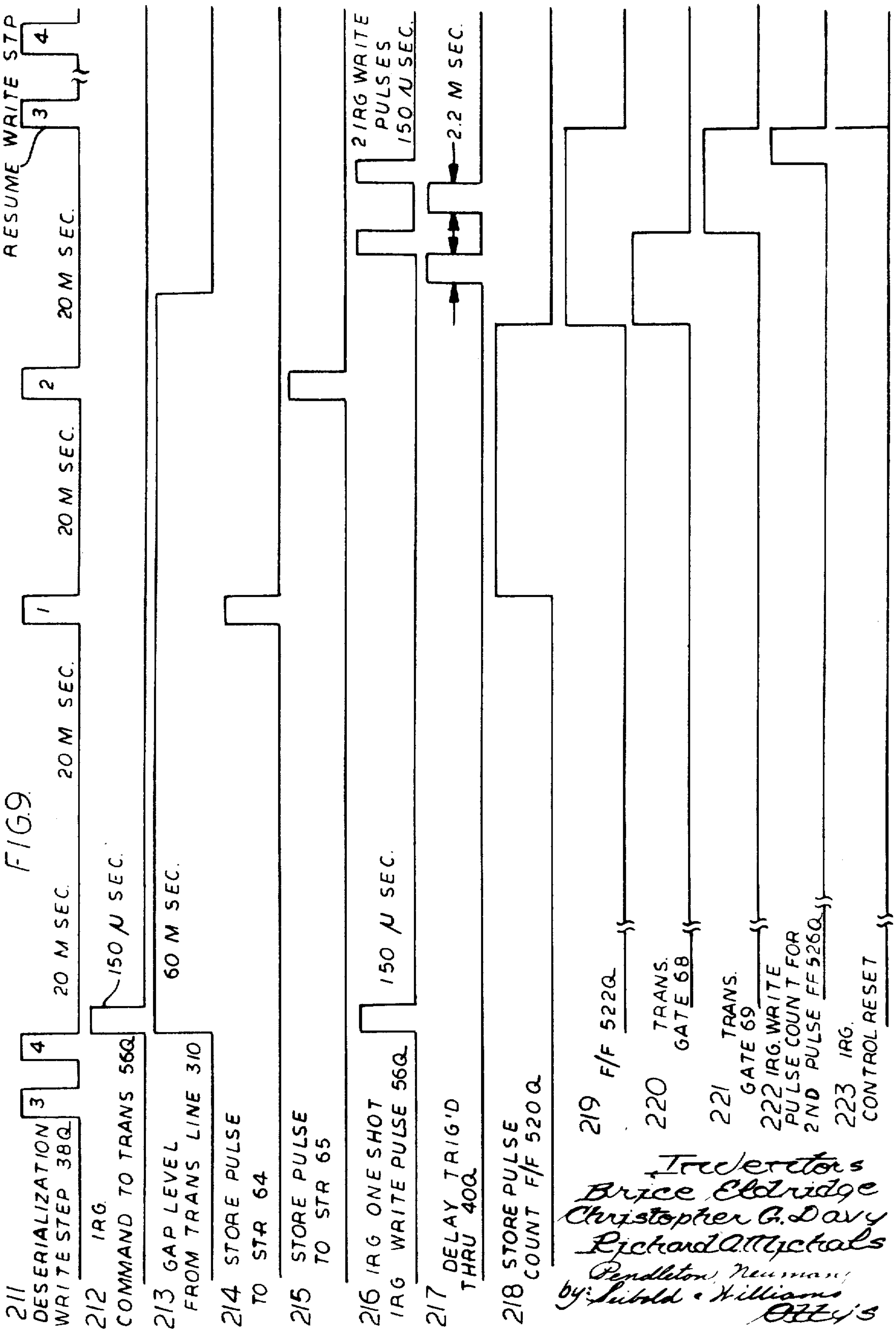
FIG. 9 is a timing chart depicting the sequence of events which comprise recording an Inter-Record Gap, storing information during the generation of this gap, and readout of the stored information after the termination of the gap.

As shown at lines 217, 218 of FIG. 9, delay one shot 40 triggers IRG/write one shot 56, which, in turn, controls transfer gates 68, 69 which are associated with storage registers 58, 59, respectively. Control Gating 70 prevents the pulse outputs of IRG/write one shot 56 from retriggering the Inter-Record Gap cycle. The first IRG/write pulse from one shot 56 transfers the information out of storage register 58 through its associated transfer gate 68, as shown at line 220. The second pulse output from one shot 56 transfers the information out of storage register 59 through its associated transfer gate 69 to output transport 5. During this readout time of storage registers 58 and 59, delay one shot 40 provides the minimum delay needed between the IRG/write command pulses to write the data on the output tape. As seen at line 222 of FIG. 9, flip-flops 524, 526 of Write and Store Count 60 count the number of IRG/write pulses issued to the transport, and prevent more than two of such pulses from being issued. It can also be seen from this timing chart that before the third complete data byte is received from playback 1 following the initiation of the Inter-Record Gap, all IRG control action is complete and normal data processing operations have been resumed. As appears more clearly in the detailed logic diagram described below, setting flip-flop 526 of Write and Store Count 60 resets IRG latch 54 and Motor Speed Latch 52 to return the playback device and interfacing device to normal operation. IRG latch 54, in turn, resets the flip-flops of the Write and Store Count 60 in anticipation of recording the next Inter-Record Gap.

Figure 10B:
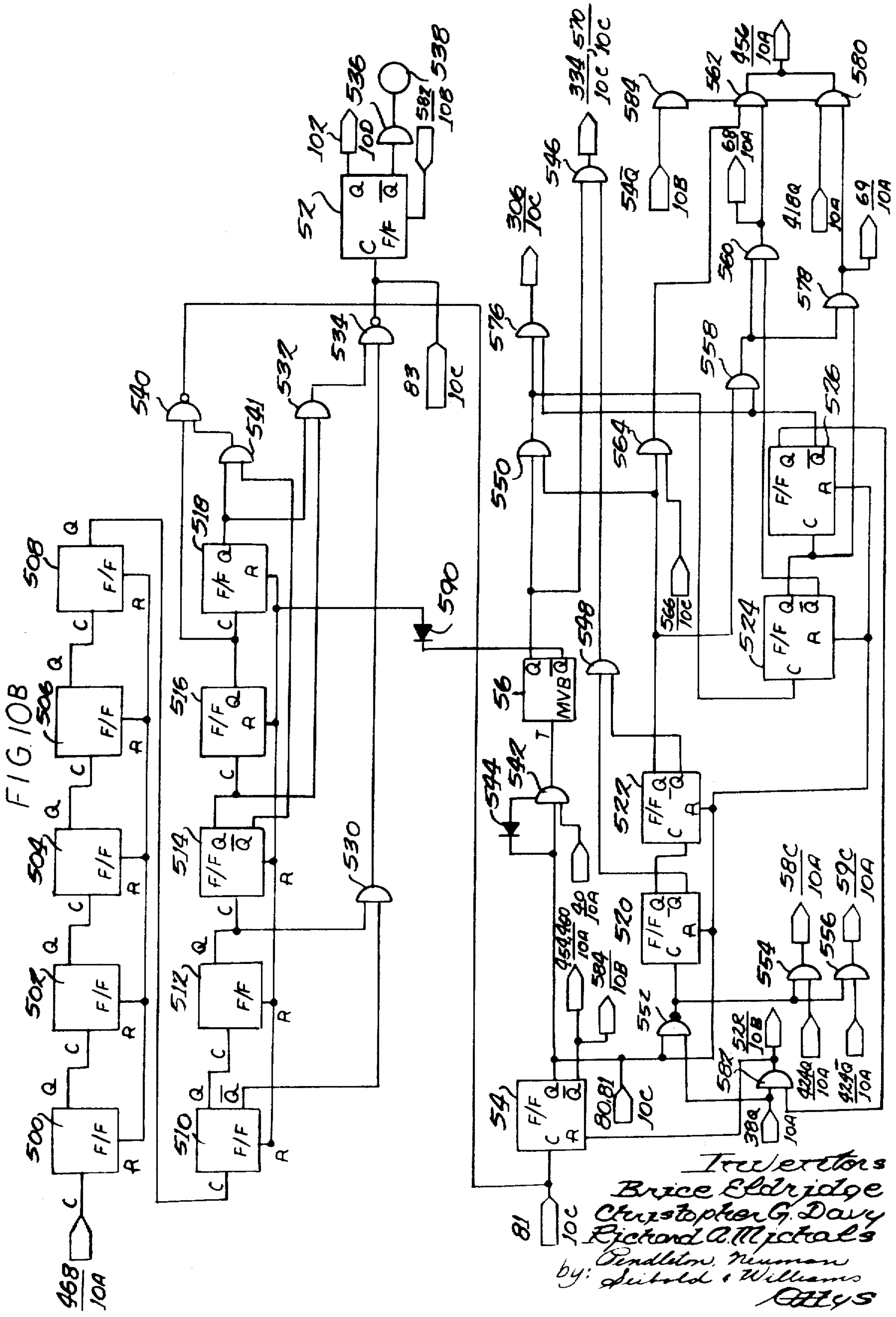
Figure 10C:
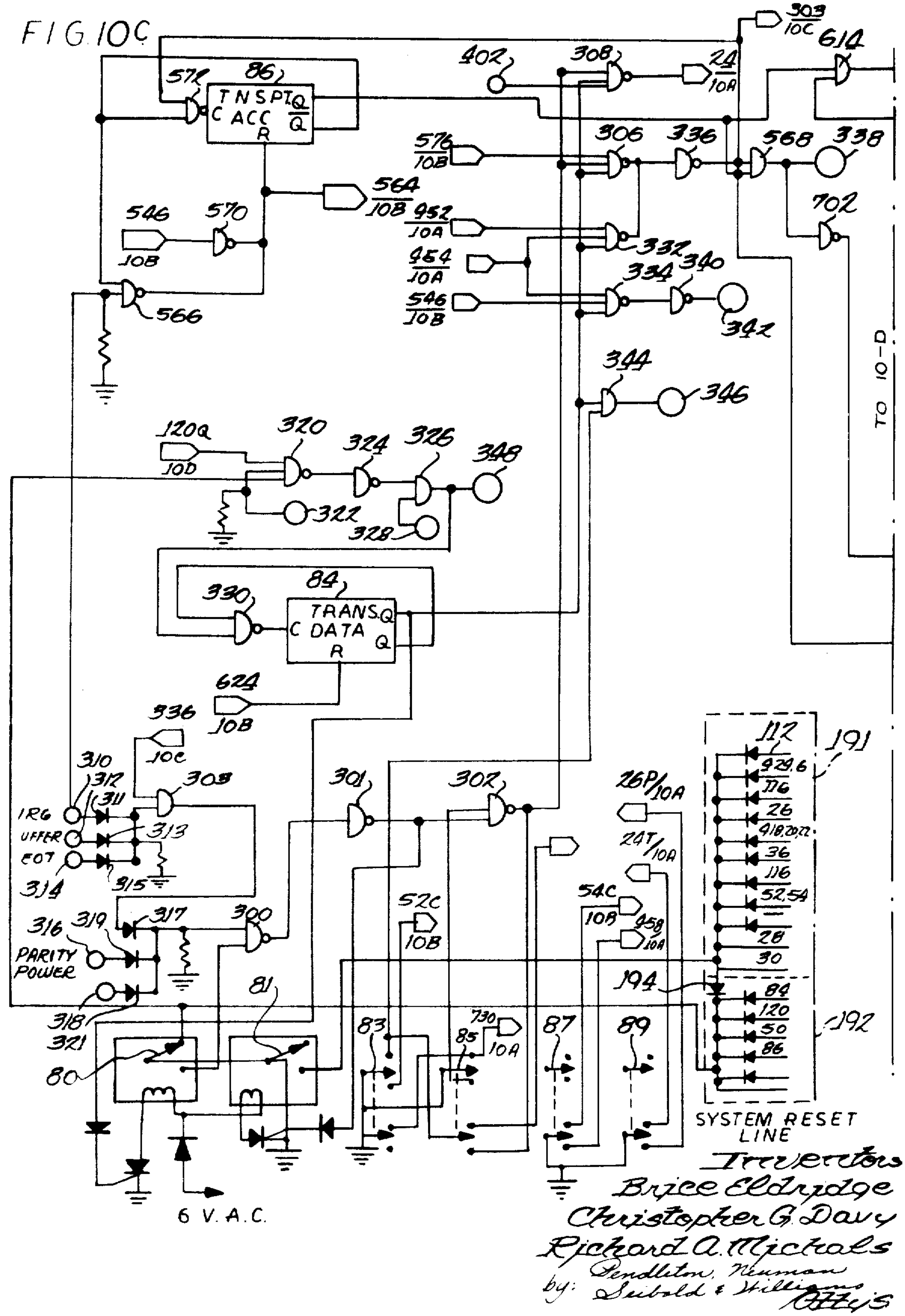

Considering the detailed logic diagrams and especially FIG. 10B, the word pulse input to IRG count 50, consisting of flip-flops 500 – 518, is provided by AND-gate 468 (FIG. 10A). The inputs to gate 468 are the write pulses from write pulse one shot 38, and the set output of dummy byte flip-flop 36. Since flip-flop 36 is set prior to the printing of every fourth byte, a pulse is sent to the clock input of the first IRG count flip-flop 500 by every fourth write pulse applied to gate 468. Thus the count maintained by IRG count 50 is of the total number of words (1 word = 4 bytes) printed.

The count of 704 words, or 2,816 bytes, which is required to set Motor Speed Control Latch 52, is kept by AND-gates 530 and 532 and NAND-gate 534. Gate 530 monitors the set output of flip-flop 512 (counts 256 bytes) and the reset output of flip-flop 510 (counts 128). Gate 532 monitors the set outputs of flip-flop 518 (counts 2,048) and flip-flop 514 (counts 512). When these four outputs are all high, then a low signal is applied by gate 534 to the clock input of Motor Speed Latch 52, setting this latch and sending a low signal via driver gate 536 to the playback speed control input via playback connecting cable 538, shifting playback 1 to low speed data input.

The IRG latch 54 initiates the IRG sequence when a high-low transition signal applied to its clock input by NAND-gate 540. The output of gate 540 goes low only when flip-flop 516 (counts 256 words) is set, flip-flop 518 (counts 512 words) is set and flip-flop 514 (counts 128 words) is reset. Output signals from the two latter flip-flop outputs are applied to AND-gate 541, whose output is applied to gate 540, together with the set output of flip-flop 516. When flip-flop 518 is set, the output of NAND-gate 540 goes low and IRG latch 54 is set.

The reset output of IRG latch 54 is connected to AND-gates 454 and 460 of the deserialization and write pulse section (FIG. 10A) to inhibit further data output to the transport 5 in the following manner. When IRG latch 54 is set at the commencement of the IRG period, the low output of the reset side is applied via AND-gate 460 to AND-gates 428 and 430, closing these gates. Since transfer gates 32 and 33 only operate to transfer output data from shift registers 28 and 30 to the transport upon receipt of a high signal from these AND-gates, the transfer of output data from the shift registers via these transfer gates is inhibited. The low signal from the reset side of IRG flip-flop 54 is also applied via gate 454 (FIG. 10A) to AND-gate 452, closing the gate and inhibiting the passage of any write command pulses from one shot 38 to the transport 5. The low signal from gate 454 also opens NAND-gates 332 and 334 (FIG. 10C) enabling the passage of the IRG commands to the transport.

Under normal operating conditions, the low output of the set side of IRG latch 54 applied to AND-gate 542 inhibits the IRG circuitry. Diode 544 which is connected from the set output of flip-flop 54 to the center pin of gate 542 holds this center pin normally low, holding the output of gate 542 high. Holding the center pin low prevents any pulses from delay one shot 40 (FIG. 10A), which is coupled to the other input of gate 542, from triggering IRG/write one shot 56 and generating spurious IRG command pulses.

In initiating the IRG sequence, flip-flop 54 is set and its set output goes high. Since no pulse output from delay one shot 40 exists at this time, and diode 544 no longer holds the center pin low, the output of gate 542 goes low. This high-low transition triggers IRG/write one shot 56, generating the IRG command pulse which is applied to the transport control logic by NAND-gate 334 (FIG. 10C) via AND-gate 546. The IRG command pulse is passed to the transport by transport connecting line 342. Gate 546 is open to pass the IRG command pulse only when the output of gate 548 is high. Gate 548 is connected to the reset outputs of flip-flops 520 and 522, which count the number of write pulses generated by one shot 38 (FIG. 10A) which are used as storage pulses during recording of the Inter-Record Gap. Thus gate 546 is closed by gate 548 with the generation of the first data storage pulse during the IRG sequence; gate 546 does not reopen until the full IRG sequence is completed. AND-gate 550, which has one input coupled to the set side of flip flop 522 and is necessarily closed when gate 548 is open, inhibits the IRG command pulse from traveling anywhere except to the transport line 342.

As indicated above, during the IRG sequence the data continues to arrive from playback 1 and be inserted in shift registers 28, 30. Transfer gates 32, 33 being inhibited, the deserialized data must be inserted in suitable storage registers 58, 59 (FIG. 10A). A suitable storage register is a MFF40 manufactured by Raytheon 9 Computer. The input lines are each connected to an output of the associated shift register. Data is transferred from the shift register to the storage register by a control pulse (marked IRG pulse) applied to the clock input. After the data is read out of the storage register by a control pulse applied to the associated set of transfer gates, the storage register is cleared for the next IRG sequence by a signal (from IRG latch 54) applied to the reset input.

The manner in which deserialized data is stored and then read out during the IRG period will now be explained with reference to the detailed logic-diagram of FIGS. 10A and 10B. When the eighth bit of input data arriving during the IRG period is inserted in shift register 28, then flip-flop 424 of the bit count is set and a write pulse is triggered from write one shot 38, as in normal operation. However, the write pulse cannot be applied to the transport because the low signal from the reset side of flip-flop 54 (which is set throughout the IRG sequence) holds gate 452 closed during the IRG sequence. The write pulse is applied to NAND-gate 552, which is opened by the high signal from the set output of IRG latch 54. The write pulse is counted by IRG/storage pulse count flip-flops 520, 522 which count the number of write pulses issued by write one shot 38 during the IRG sequence and used as storage pulses. AND-gate 554 is now opened by the high output from the set side of flip-flop 424 (the bit count having reached eight). Thus the pulse output of gate 552 also passes through gate 554 to the clock input of storage register 58, thereby transferring the data in shift register 28 into associated storage register 58. In a similar manner, upon the insertion of the next 8 input data bits into shift register 30, the bit count reaches 16 and flip-flop 424 is reset, generating a second write pulse which is stored in IRG/storage pulse flip-flops 520, 522. The pulse is also passed via gate 556 to the clock input of storage register 59, storing the data from shift register 30 therein.

Since the elapsed time of two input bytes is well in excess of 60 msecs. (the time required to record the Inter-Record Gap), transferring output data to the transport 5 is resumed after the second byte is stored in register 59. The first two data output bytes to be sent to the transport are those stored in registers 58, 59. These bytes are sent via the storage registers associated transfer gates 68, 69; the necessary write pulses are supplied by IRG/write pulse one shot 56 in response to trigger pulses from delay one shot 40. The details of this transfer of stored data will now be disclosed.

When flip-flop 522 is set (indicating that two storage pulses have been received from write one shot 38) and flip-flops 524 and 526 are reset (indicating that no IRG/write command pulses have been generated by write one shot 56), then the outputs of AND-gates 558 and 560 are high. The high signal from gate 560 is applied to the control gate of transfer gate 68 transferring the data in storage register 58 to the transport 5.

The low-to-high transition signal output of gate 560 which results from setting flip-flop 522 is also applied to the input of AND-gate 562. The other input of gate 562 is the output of AND-gate 564 which goes high at the end of recording of the Inter-Record Gap by the transport. The inputs of gate 564 are the set output of flip-flop 522 (set by the second IRG storage pulse from one shot 38), and the output of NAND-gate 566 (FIG. 10C) which is high except during a recording by the transport of the Inter-Record Gap. The output of gate 566 depends on the state of Transport Accept Latch 86 (FIG. 10C).

Transport Accept Latch 86 is set during all normal operations of the data transfer system. The set output of the latch is applied to gate 568, holding the gate open to pass write command pulses to the transport via transport connecting line 338. The latch 86 is held set by the low output of gate 546 (FIG. 10B) applied to the reset input of the latch by inverter 570.

At the start of the IRG sequence, setting IRG latch 54 resets Transport Latch 86, the necessary signal being supplied via NAND-gate 332, Inverter 336 and NAND-gate 572. Latch 86 remains reset until processing of the Inter-Record Gap ends. A signal indicating the end of processing is supplied from transport 5 via transport connecting line 310 to now-open NAND-gate 566, setting Latch 86 and allowing the passage of IRG/write command pulses to the transport.

The low to high transition signal output of gate 566 (FIG. 10C) which results from the end of the recording of the Inter-Record Gap passes via gate 564 to the input of gate 562. This signal is then coupled to the center pin of gate 456 (FIG. 10A), inverting the signal. Thus a high-low transition signal is presented to the input of delay one shot 40, triggering a pulse output therefrom. The trailing edge of the pulse output of one shot 40 in turn triggers IRG/write one shot 56 via gate 542, which is held open by the set output of IRG latch 54. The set side of flip-flop 522 is holding gate 550 open, while the reset side of flip-flop 526 holds gate 576 open (indicating that less than two IRG/write pulses have been generated). Thus AND-gate 576 passes the IRG/write pulse output of one shot 56 to the transport write control circuitry (FIG. 10C), specifically gate 306.

The same write pulse, being the first IRG/write pulse, sets flip-flop 524, which is one of the pair of flip-flops used to count the number of IRG/write command pulses generated to write stored data onto the transport tape.

Setting flip-flop 524 closes gate 560, the control gate for transfer gate 68 (FIG. 10A), preventing any further data transfer via this gate. Setting flip-flop 524 also generates a high output from gate 578, the control gate for transfer gate 69, gate 578 is being held open by the high signal from AND-gate 558. The resulting high signal from gate 578 enables transfer gate 69 to transfer the data from register 59 to the transport 5 where it is written on the tape in response to the second IRG/write command pulse generated.

AND-gate 580 is now open in response to the high signal from gate 578 to pass the next succeeding low-to-high transition signal output from the set side of flip-flop 418 (of the bit count, FIG. 10A). The leading edge of the transition signal, inverted by gate 456, triggers delay one shot 40 whose pulse output triggers one shot 56 producing the second IRG/write pulse.

The second write pulse, applied to the clock input of the paired flip-flops 524, 526 of the IRG/write pulse count resets flip-flop 524 and sets flip-flop 526, closing AND-gate 576 to the passage of any further IRG/write command pulses from one shot 56 to the transport. The output of AND-gate 558 also goes low in response to flip-flop 526 being set, closing gates 560 and 578 which control transfer gates 68 and 69, preventing any further transfers of output data from the storage registers 58, 59 to transport 5. Gates 562 and 580 are also closed by the low outputs of gates 560 and 578 respectively, preventing any stray pulse in the IRG circuit from triggering one shot 40. Setting flip-flop 526 also opens AND-gate 582; the next write pulse output of one shot 38 (the third one generated since the end of recording the Inter-Record Gap) passes via this gate to reset Motor Speed Latch 52, returning the playback unit 1 to normal speed. The same write pulse resets IRG Latch 54. This, in turn, resets IRG/write pulse count and storage pulse count flip-flops 520, 522, 524 and 526, placing the IRG circuit in a ready state for the next Inter-Record Gap sequence. The flip-flops of the IRG count, 500–518, are reset by a negative going pulse from the negative output of one shot 56, via diode 590. The high output of the reset side of flip-flop 54 is also applied to driver gate 584, whose center pin is connected to the center pins of gates 562 and 580. The high input to gate 584 forces the center of the latter two gates low, preventing the passage of any spurious trigger pulses to one shot 40 from the IRG circuitry.

INPUT/OUTPUT CONTROL

The Input/Output Control shall now be generally described with respect to the block diagram of FIG. 2. A more detailed explanation of the input and output conditions under which the data transfer device of this invention operates shall be given in connection with the detailed logic diagram, especially FIG. 10C.

The transfer data switch 80 resets all latches and counters of the data transfer device. It is this switch which clears the device of all previously existing random and spurious information and prepares the device to accept the information recorded on the tape on the playback device 1. By comparison, the Selective Reset switch 81 resets only selected portions of the logic, amounting to some 80 percent of the system latches and flip-flops. Its effect is limited to resetting the Alignment Error Checking and data input sections of the interfacing device.

The Transfer Data Latch 84 is the basic mechanism for determining that all internal and external conditions which are established as necessary for the proper operation of the device are met. Transfer Data Latch 84 itself must originally be in the reset state to assure that once it is set, thereby beginning data transfer operations, no signal can affect its status except a signal properly directed to the reset of the latch. This is a safeguard against random signals which may exist on the transport ready and playback cue lines after the device is started. The Transfer Latch 84 may only be set if the tape of the playback device 1 is in the proper position for reading, the transport unit is prepared to accept output data, and all flip-flops in the interfacing device are reset.

The Cue Gating means 82 checks the position of the tape within playback device 1. A metallic strip is applied to the tape at the point at which actual recorded data begins. The strip causes a signal to be sent to the Cue Gating means 82, indicating that data reading may begin. This check insures that no recorded data is ignored, and also prevents the reading of random and spurious signals which may precede the start of recorded data.

Transport Accept Latch 86 controls the actual transfer to the transport of write pulses generated by the interfacing device. Setting latch 86 also enables the Alignment Error Detection and Correction system which checks all data to be written on the computer tape for errors, and enables the End of the Tape Playback timing system to detect the end of recorded data on the playback tape. These systems are fully described in succeeding sections of this disclosure. Transport Latch 86 is reset by the leading edge of a command pulse initiating an Inter-Record Gap recording sequence. This is to prevent error from being introduced into the output data during the Inter-Record Gap sequence. It is possible (theoretically) to issue both a write pulse and an Inter-Record Gap command, such that the write pulse updates the buffer register of the transport 5 but the transport does not actually write the byte on the output data tape (due to the Inter-Record Gap command). If such an error were to occur, the check character at the end of the record next recorded would include an extra byte that was not in fact written on the tape, producing an irrecoverable error in the recorded information.

Considering the specific functions of the switches, the switches are shown in FIG. 10C in their normal operating positions, i.e., the positions they are left in during normal data transfer operations. Transfer Data Switch 80 is electrically connected to all of the diodes tied to the system reset line, as shown at locations 191, 192. Resetting this switch applies a pulse to the reset input of all the registers and flip-flops in the data transfer system, effecting a total reset of all flip-flops in the system and clearing the system of all accumulated information. The reset pin of switch 80 is coupled to the input of NAND-gate 300. Gate 300 is coupled via inverter 301 to NAND-gate 302. Grounding the reset pin of switch 80 forces the output of gate 300 high, sinking the output of NAND-gate 302 (whose other input is high, in normal operation). The low output of gate 302 closes NAND-gates 306 and 308. Closing gate 306 prevents the transfer of any write pulses to the transport while the switch 80 is in the reset position; closing gate 308 prevents any input data from being applied to the data transfer device from playback 1. Note that a low signal on any of output transport condition monitoring lines 310, 312, 314, 316 and 318 has the same effect of terminating write pulse and input data transfers. Transport connecting lines 310, 312, and 314 are connected to an input of AND-gate 303 via isolation diodes 311, 313 and 315 respectively. The output of inverter 336 is applied to the other input of gate 303; a high signal output from this normally low inverter is required to generate a high signal from gate 303. Isolation diodes 317, 319, and 321 are used to couple transport monitoring lines 316 and 318 and the output of gate 303 to the common input of gate 300. A high signal on any of lines 316, 318 or from gate 303 forces gate 300 low, stops data transfer and lights the error light associated with Error Reset Switch 81 until this Error Reset switch is reset.

Error Reset Switch 81 is electrically isolated by diode 194 from the major control flip-flops as well as the flip-flops of the IRG count, shown at 191; resetting of this switch clears only those flip-flops most directly and immediately concerned with data input and error checking, shown at 192.

Manual/Motor Switch 83 is shown in the center, off position which is the normal operating position. The up position places the unit in manual capability, i.e., input data can be applied directly to the data flip-flop 26. The Alignment Error section is inhibited. The down position reverses the state of the Motor Speed Control Latch 52 in such a way that the playback speed cannot be changed. When the switch is in this position, the clock trigger input to Latch 52 is grounded. The speed of the playback device with the switch in this position remains high regardless of Inter-Record Gap commands.

Inhibit, Input/Output Freeze Switch 85 is shown in the center, off position. Putting the switch in the upper position inhibits the Alignment Error circuit; if the Manual Switch is also in the upper position, the End of Tape Playback circuitry is also inhibited. Setting the switch in the down position locks out all input data timing pulses and Inter-Record Gap commands.

Inter-Record Gap/Write Switch 87 is shown in the center, off position. The momentary up position of the switch is used to set the IRG Latch 54. The momentary down position is used to trigger write pulse one shot 38 to issue a write pulse.

Clock/Data Switch 89 is shown in the center, off position. The momentary up position is used to trigger one shot 24 to issue a clock pulse. The momentary down position is used to preset the Data Information Latch 26 introducing a data pulse to the system.

Considering FIG. 10C, the sequence for starting data transfer from playback 1 to transport 5 requires that the reset output of End of Tape Playback (hereafter also termed EOTP) Latch 120 applied to NAND-gate 320 be high. Upon receipt of a high Transport Ready signal via transport line 322 a low output results which is inverted by Inverter 324 and applied to AND-gate 326. Gate 326 is now open to a cue signal from the playback unit 1 via connecting line 328 indicating that the tape on the playback unit is properly positioned for reading. The high output resulting from the application of the cue signal to gate 326 is applied to NAND-gate 330, resulting in the setting of Transfer Data Latch 84. Once set, the resulting low input to gate 330 from the reset side of latch 84 maintains the Transfer Data Latch in the set state until detection of the end of recorded material on the playback tape by EOTP Latch 120.

Setting transfer data latch 84 opens NAND-gates 306, 308, 332, and 334 of the Input/Output Gating section. Opening gates 306 and 308 also requires a high output signal from Input/Output Inhibit gate 302. Gate 306 is a control gate for passing write command pulses to the transport. Gate 308 passes timing pulses from playback 1 to clock pulse one shot 24. Gate 332 passes the write step pulses generated by write pulse one shot 38 to the transport 5 via inverter 336 and gate 568 to Write Step connecting line 338. Gate 568 imposes the condition that the Transport Accept Latch 86 must be set before any write pulse commands may be sent to the output tape transport.

The IRG Command pulse is passed by gate 334 via inverter 340 to transport connecting line 342. During recording of the Inter-Record Gap, gate 334 is closed by the low level output of the reset side of IRG latch 54. Gate 306 passes the write pulses generated during the Inter-Record Gap sequence by IRG/write pulse one shot 56 to transport connecting line 338 via inverter 336. AND-gate 344 is also opened by the setting of Transfer Data Latch 84, sending a signal to disable the manual controls to output transport 5 via transport connecting line 346.

The signal from gate 326 which sets Transfer Data Latch 84 and opens the gates of the gating section described above is also transferred to the playback unit 1 via playback connecting line 348, starting the application of input data to the data transfer device. The mechanism for ending data transfer is described in a succeeding section.

END OF TAPE PLAYBACK

Figure 10D:
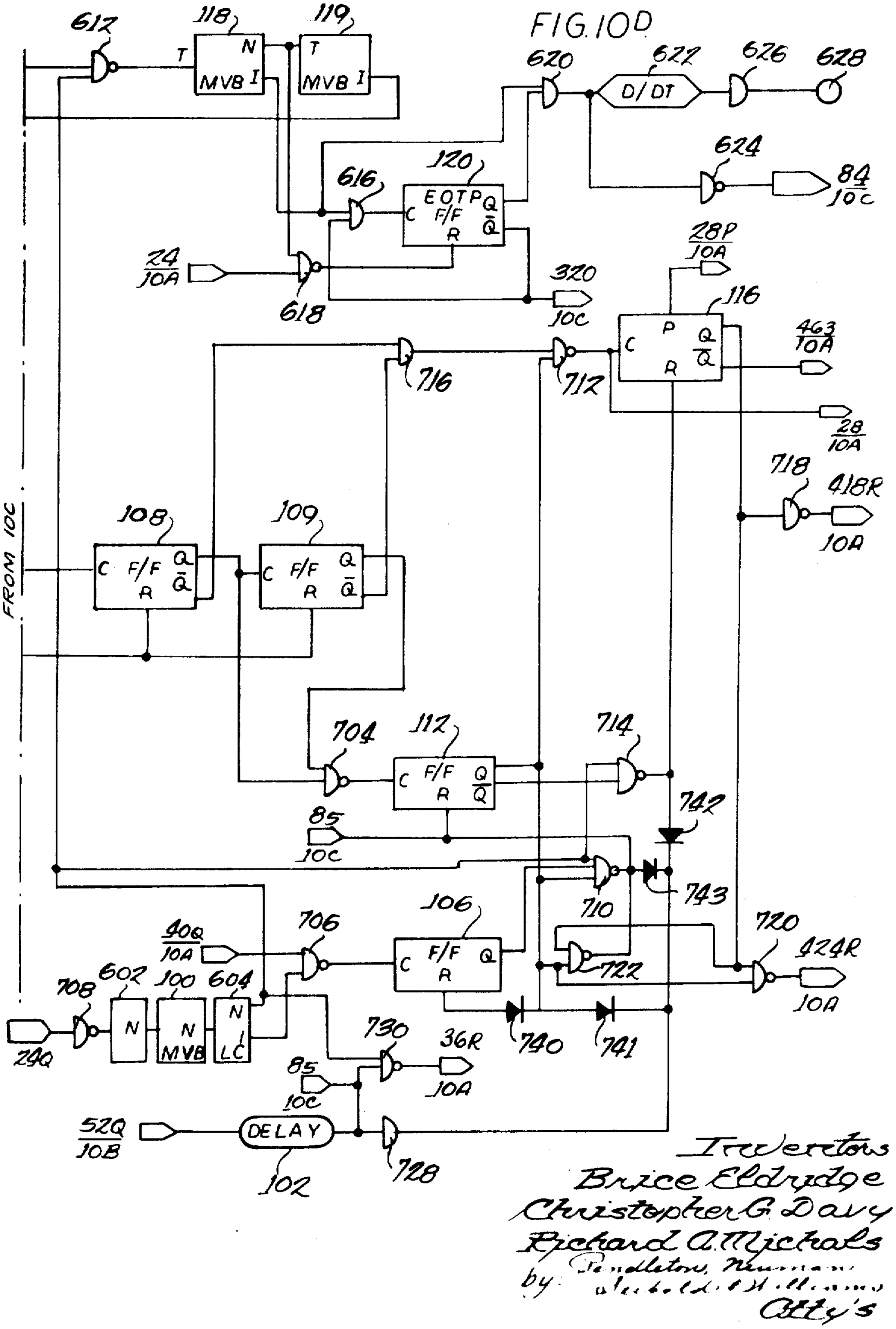

The End of Tape Playback (hereinafter also referred to as EOTP) detection circuit senses a lack of incoming timing pulses from the tape playback 1 in order to determine that the end of data recorded on the playback tape has been reached. A general description of the End of Tape Playback detection circuit shall be given with reference to the block diagram of FIG. 5 and the timing chart of FIG. 7. The logic circuitry of the specific embodiment is shown in FIG. 10D.

If no timing pulses are detected over a minimum period of time an End of Tape Playback latch 120 is set and a timing circuit sequence is initiated. The reset input of the EOTP flip-flop is coupled to the clock pulse generator 24, which develops a pulse output for each timing pulse input. The EOTP latch must be reset by a clock pulse within time limits set by the timing circuit, or an end-of-data signal is generated and data transfer operations are ended.

The EOTP detection circuit is initially enabled by a signal from the set output of Transport Latch 86. Transport Latch 86 inhibits the operation of the EOTP circuit until data is actually being received from the playback unit. As is shown in the block diagram of FIG. 5, the system clock pulses generated by clock one shot 24, in response to the timing pulses of the data input are applied to the input of a suitable integrating one shot multivibrator 100. The input to and output from this integrating one shot 100 are shown at lines 122 and 124 respectively of the timing chart of FIG. 7.

The integrating one shot 100 develops a non-zero output signal only when no timing pulse is applied to its input for a period of approximately 800 microseconds. This output signal is applied to the trigger input of pulse dropout one shot multivibrator 118, a conventional multivibrator having an output time interval of 60 milliseconds and used to establish the time limits mentioned above for resetting the EOTP circuit. The pulse output of one shot 118 sets End of Tape Playback Latch 120, as shown in the timing chart at line 128. EOTP Latch 120 is reset by the occurrence of any system clock pulse during the period of one shot 118. If no clock pulse occurs within the time limits established, the set output of the EOTP Latch 120 and the inverted output of one shot 118 combine to reset Transfer Data Latch 84 (see FIG. 2) ending all data processing, and to send a File Gap Command pulse to the output data transport 5, as shown at line 132 of the timing chart. In response to the command pulse the transport places a file gap on the output data tape, indicating the end of recorded input data on the tape of playback unit 1.

The End of Tape Playback Detection Circuit depends on the integrating one shot 100 which depends on clock pulses occurring at approximately the high speed rate of data input. Therefore, the EOTP circuit is inhibited during the Inter-Record Gap period, when the playback unit 1 is operating at low speed, and a spurious EOTP signal might be generated due to the slow data input rate.

As shown in the specific logic diagram of FIG. 10D, an integrating one shot 100 is connected between the output of clock pulse one shot 24 and the input of pulse dropout one shot 118 by means of voltage level changers 602 and 604, respectively. Integrating one shot 100 has an output only when no clock pulse is applied to its input for a period of at least 800 microseconds. A suitable integrating one shot is a type R303 multivibrator manufactured by Digital Equipment Corporation. The input and output operating voltages of one shot 100 are converted to the voltage levels of the remainder of the logic circuit by suitable voltage level changes 602 and 604 shown in detail at FIGS. 15 and 16, respectively.

Figure 15:
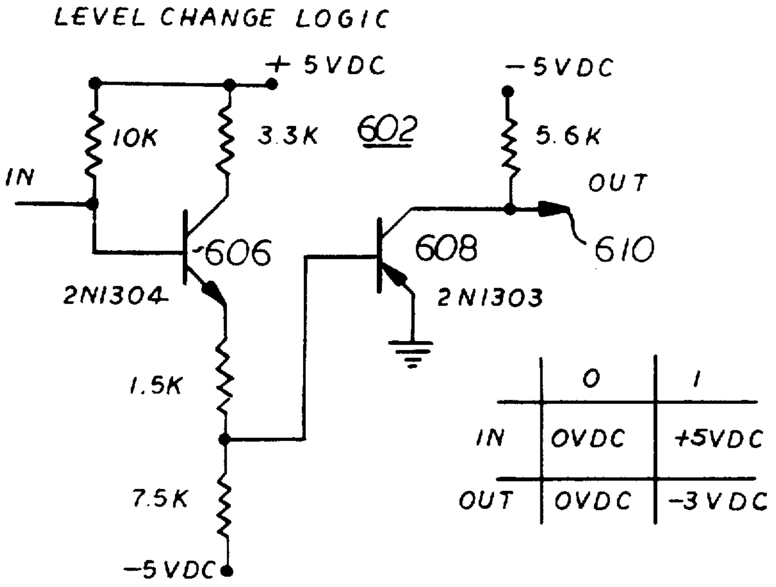
FIGS. 15 and 16 depict the level change circuits used in this invention in conjunction with the integrating one shot multivibrator shown in FIG. 10D.

Considering the level changer 602 of FIG. 15 as an example (since the level changer of FIG. 16 operates in a similar manner), when zero volts is applied to the base of transistor 606, the transistor is turned off and no current flows therethrough. Thus a minus voltage is applied to the base of transistor 608 which is effectively operating as a voltage variable resistor. Transistor 608 is now on, and the collector and output 610 are at zero, ground potential. When plus five volts (the voltage level representing plus one through the remainder of the circuit) is applied to the input, transistor 606 is turned on, in turn turning transistor 608 off. The result is a negative voltage output from collector to ground at output 610, a voltage level suitable for resetting the integrating one shot 100, and preventing an output.

The output of one shot 100 is coupled to the input of pulse dropout one shot 118 by NAND-gate 612. Gate 612 is opened by a high signal from AND-gate 614 (FIG. 10C), whose inputs are the set output of transport latch 86 and the inverted output of dropout detector delay one shot 119. Transport latch 86 is set by the first write pulse issued to the transport and remains set until data transfer is completed, with the exception of a part of each Inter-Record Gap period as explained above. One shot 119 is normally off; it is triggered by the trailing edge of a pulse output of 118. Detector delay one shot 119 is used to allow one shot 118 time to recover from generating an output pulse before being retriggered. Thus the output of gate 614, being coupled to the inverted output of one shot 119, is normally high, holding gate 612 open. When integrating one shot 100 triggers one shot 118 whose output in turn triggers one shot 119, the output of gate 614 goes low, closing gate 612 for the duration of the pulse output of one shot 119. In this manner one shot 119 allows one shot 118 time to recover from each pulse cycle.

The inverted output of one shot 118 is coupled to the clock input of EOTP latch 120 via AND-gate 616. The other input to the gate is the reset output of latch 120. Thus the output of gate 616 is normally high; it goes low, setting latch 120, at the initial triggering of one shot 118 which forces the inverted output of one shot 118 low.

The normal output of one shot 118 is coupled to the reset input of latch 120 via NAND-gate 618. The pulse output from one shot 118 opens gate 618 to the passage of the next clock pulse generated by clock pulse one shot 24; thus a clock pulse occurring during the time of the pulse output of one shot 118 resets latch 120.

The circuit logic for generating an EOTP pulse includes the inverted output of one shot 118 and the set output of latch 120 connected to AND-gate 620, whose output is connected to differentiator 622 and inverter 624. The differentiator 622 is coupled to transport connecting line 628 by driver gate 626. The inverter 624 is connected to the reset input of Transfer Data Latch 84 (FIG. 10C).

If no clock pulse issues from clock one shot 24 to reset latch 120 before the end of a pulse from one shot 118, then the outputs of latch 120 and one shot 118 are combined by gate 620, resulting in a File Gap Command pulse being issued to the transport by differentiator 622, and an EOTP pulse signal being sent to latch 84 via inverter 624 by driver gate 626 and transport connecting line 628. The file gap recorded on the computer tape, indicates the end of recorded data to the computer; the inverted EOTP pulse resets Transfer Data Latch 84, ending data transfer by the interfacing device.

Note that the reset output of EOTP latch 120 is coupled to an input of NAND-gate 320 (FIG. 10C), whose other input is coupled to Transfer Data Switch 80. Thus it is absolutely essential if data transfer is to be restarted that EOTP latch 120 first be reset. This is done via the system reset lines 191, 192 disclosed in the Input/Output control section.

To prevent the issuance of any false File Gap command or EOTP pulses during the Inter-Record Gap period, when the rate of data input is slowed, the Inter-Record Gap Command pulse is applied to the reset input of Transport Latch 86 by inverter 570 (FIG. 10C). Resetting latch 86 closes gate 612, preventing any pulse from reaching the trigger input of one shot 118 and effectively inhibiting the EOTP circuitry.

ALIGNMENT ERROR DETECTION AND CORRECTION

The Alignment Error Detection and Correction logic is explained below with reference to the block diagram of FIG. 5 and the timing chart of FIG. 6. The specific embodiment disclosed herein is then explained with reference to the logic diagram of FIG. 10D.

The Error Checking logic is based on the fact explained above that in this specific embodiment the input data consists of 24 binary timing pulses, each defining a single data subinterval, followed by a blank space on the input data line of a known duration. It is also known that a sequence of three data bytes followed by a fourth dummy byte is unique to a correct output word. If the dummy byte is not in its proper fourth position within the four byte group which comprises a "word" of output data, then the full word boundary correlation within the computer which processes the output data will be lost. The Alignment Error section of the invention provides means for checking the alignment of each 4-byte word of output data as it is written on the transport tape. The timing of the logic of this section, which is all-important to its successful operation, is shown in FIG. 6.

Figures 5, 7:
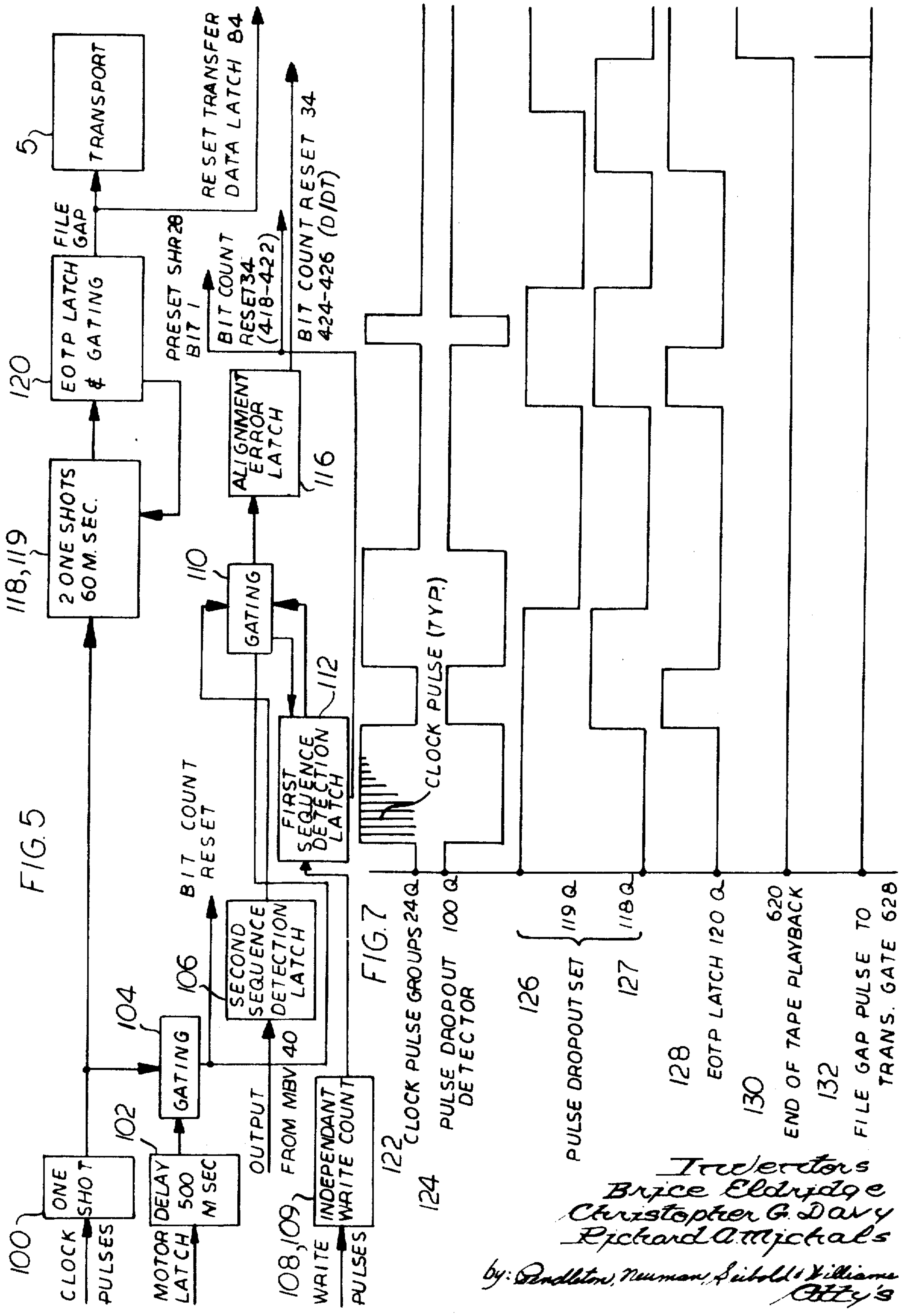
FIG. 5 is a block diagram more detailed than FIG. 1 illustrating means for detecting and correcting alignment errors within the interfacing device, and means for detecting the end of information supplied by the data input device.
FIG. 7 is a timing chart depicting the sequence of operations for detecting the end of input data on the playback tape (also see FIG. 6).
Figure 6:
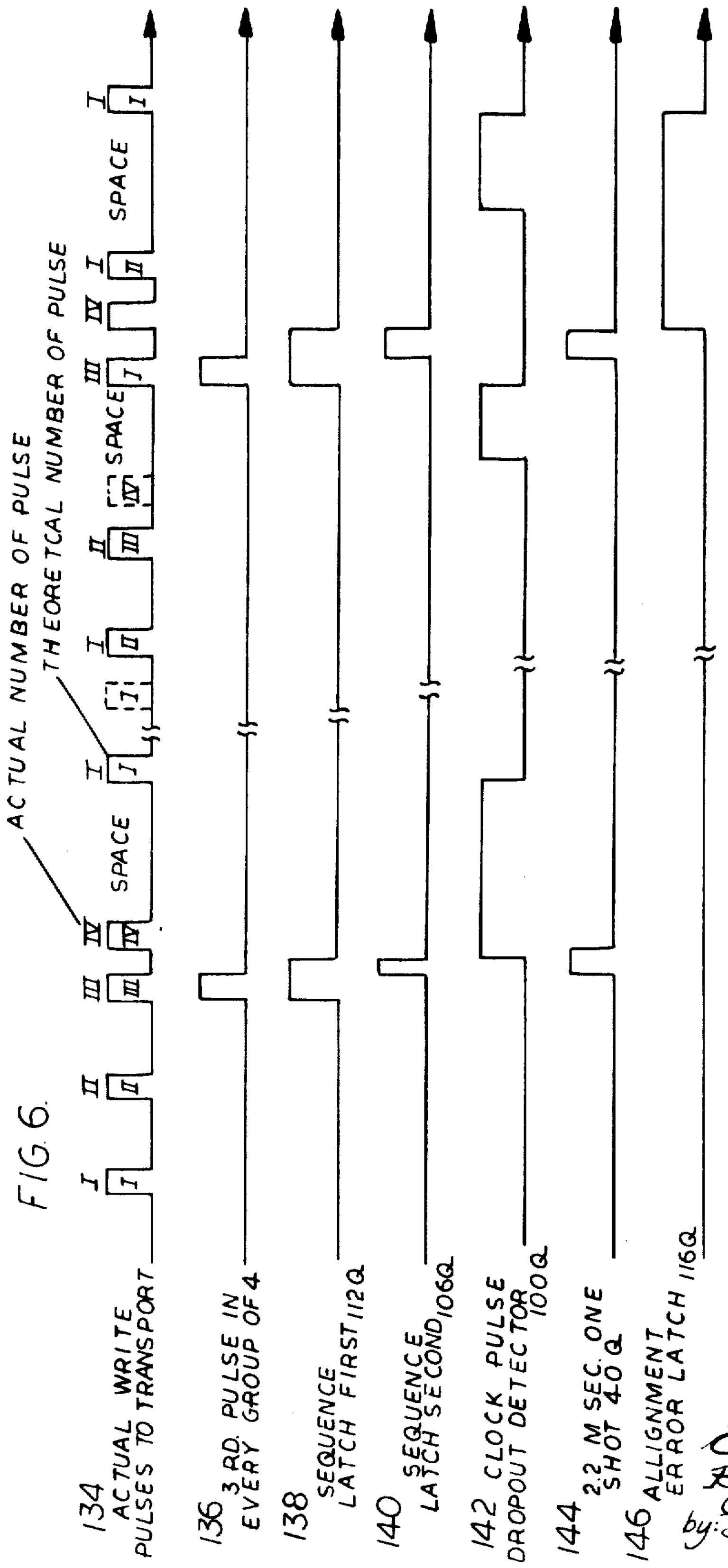
FIG. 6 is a timing chart depicting the sequence of operations comprising alignment error detection and correction in the interfacing device of this invention.
Figure 8:
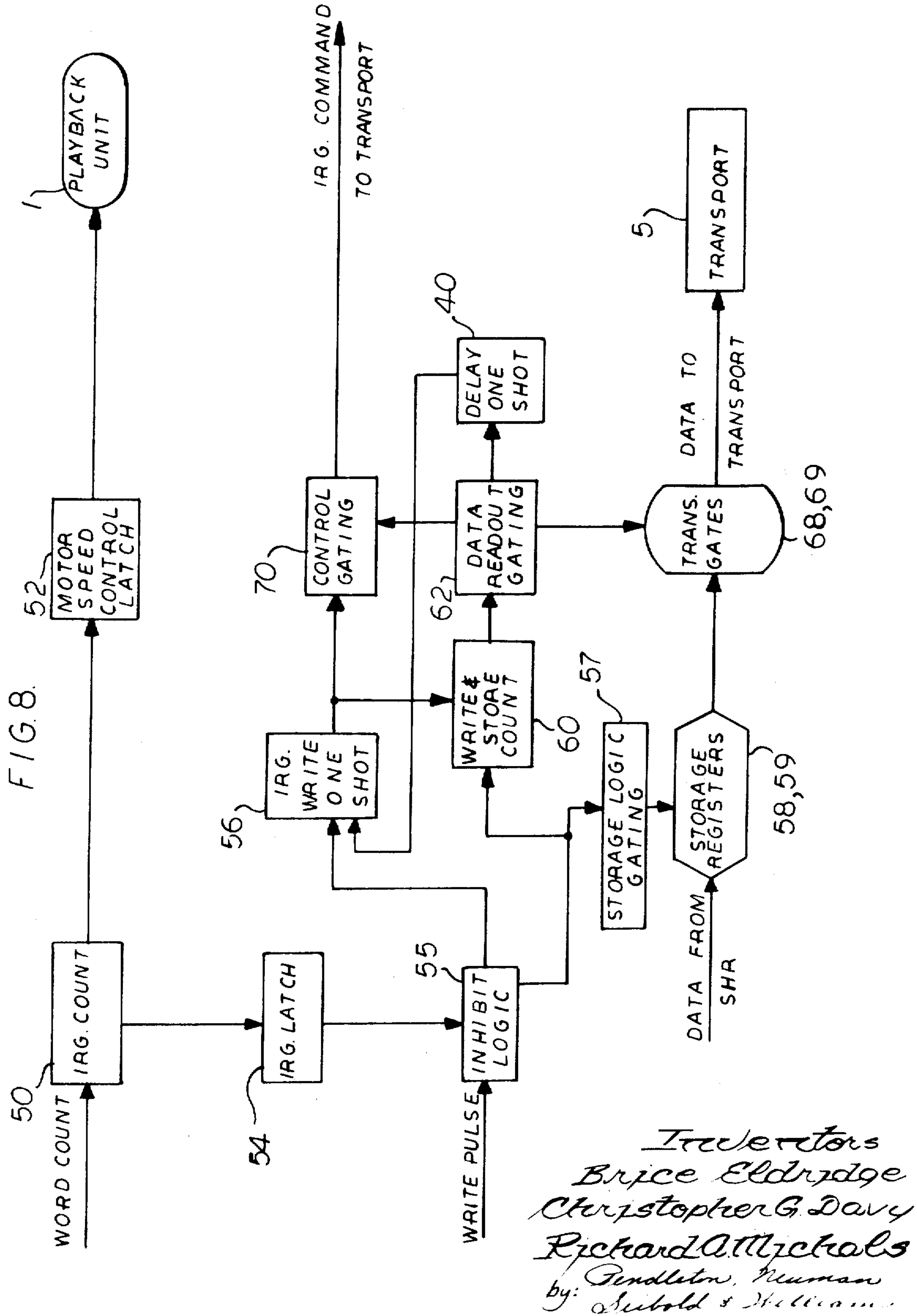
FIG. 8 is a block diagram more detailed than FIG. 1 illustrating means for recording an Inter-Record Gap, and for storing the input data deserialized during the recording of this gap.

Considering the block diagram of FIG. 5, the Write Word Count, comprising two flip-flops, 108, 109 provides the necessary timing for checking that the unique sequence outlined above is observed in writing each word of output data on the transport tape. The Write Word Count 108, 109 has a capability of counting to four. Its input consists of all write pulses generated by the data transfer device and sent as write commands to the transport, whether during normal operation or during the Inter-Record Gap period. The write word count thus continuously indicates the number of bytes ordered written on the output tape in writing a word of output data. It is reset to zero at the beginning of each record.

The following steps are followed in logically determining if an alignment error exists. First, the leading edge of the third write pulse, as counted by Write Word Count 108, 109, sets First Sequence Detection Latch 112. This is shown in the timing chart of FIG. 6, lines 134, 136 and 138.

Second, the leading edge of the output pulse from delay one shot 40 (FIG. 4) sets Second Sequence Detection Latch 106. The trailing edge of this same pulse from delay one shot 40 triggers the fourth write pulse, writing the dummy byte on the transport tape. This sequence clearly appears on lines 134, 144 of the timing chart. A condition precedent to setting flip-flop 112 is that flip-flop 106 must be in the set condition.

Third, the area designated "space" on line 134, which indicates the lack of clock pulses in the system after the 24th bit in a stroke of good input data, is detected by an integrating one shot Pulse Dropout Detector 100. As explained above in connection with the End of Tape Playback Detection Circuit, the output of Pulse Dropout Detector 100 is inhibited by any system clock pulse occurring during the period of integration, and, therefore, integrating one shot 100 has an output only-during the time the "space" in input timing pulses, as represented by system clock pulses, actually exists, i.e., between the 24th bit of a first stroke and the first bit of a succeeding stroke. This is shown at line 142 of the timing chart.

Fourth, the output of the Pulse Dropout Detector 100 is used, together with the outputs of Sequence Detection Latches 112 and 106, to reset First Detection Latch 112. If the sequence established as unique to a correctly aligned word is satisfied, then First Sequence Latch 112 is reset before the fourth write pulse is detected by the Write Word Count 108, 109, and output data continues to be processed and sent to the transport. If the sequence is not satisfied, then Alignment Error Latch 116 is set by the fourth Write Pulse detected by the Write Count. Setting this Error Latch resets the Bit Count through 34 (FIG. 4), holding flip-flop 418–422 reset (thereby ignoring all incoming data and preventing the generation of any write pulses), and resets First Sequence Latch 112.

The Error Correction logic is now waiting for a blank space, as detected by Integrating Pulse Dropout Detector one shot 100 to reset the Error Latch 116, terminating the reset-hold state of flip-flops 418–422 of the Bit Count and allowing renewed processing of input data. The detected blank space is presumably the beginning of a good word. Lines 134, 142, and 146 of the timing chart of FIG. 6 clearly illustrate the correction sequence, including at the far right turning off Alignment Error Latch 116 at the beginning of a good word. In an added feature, to indicate to the associated computer which operates on the deserialized data than an error has been detected, the Error Latch 116 presets bit 1 of shift Register 28 (FIG. 10A) so that the first bit of the next word written on the computer tape is on or logical one. This bit is defined as off or logical zero by the input data convention outlined above; its being on indicates to the computer that the preceding word contains erroneous data.

Since proper operation of the Alignment Error circuit depends upon the Clock Pulse Dropout Detection one shot 100 which depends on high speed timing pulse input, the error circuit is inhibited when the data input to the device is manual or at low speed (e.g., during the Inter-Record Gap sequence). In connection with this, a delay circuit 102 allows 500 msec. for the playback unit to return to high speed after Motor Speed Control Latch 52 is reset at the end of the Inter-Record Gap period (returning the playback device, the source of input timing pulses, to normal operating speed).

The sequence of operation of the logic devices of FIG. 10D is explained below with reference to properly aligned data output, as shown at the far left and far right of the timing chart of FIG. 6. Changes in the sequence of operation resulting from alignment error, shown in the center of the timing chart of FIG. 6, are specifically noted as they occur.

The detailed logic diagram of FIG. 10D shows that all the write command pulses sent to the transport via connecting line 338 are also applied to the clock input of the Write Word Count flip-flop 108 via inverter 702 (FIG. 10C). The set outputs of the two flip-flops 108, 109 are connected to the clock input of first sequence flip-flop 112 by NAND-gate 704. After the third write pulse in a series, flip-flops 108, 109 are both set, resulting in a low output from gate 704 which sets the First Sequence Latch 112. The set output of flip-flop 112 is coupled to the reset input of Second Sequence Latch 106. A low signal to the reset input of flip-flop 106 holds the set output low; once the signal is removed (by setting flip-flop 112), then flip-flop 106 is set by the leading edge of the next pulse received from delay one shot 40 applied to the clock input of flip-flop 106 via NAND-gate 706.

Figure 16:
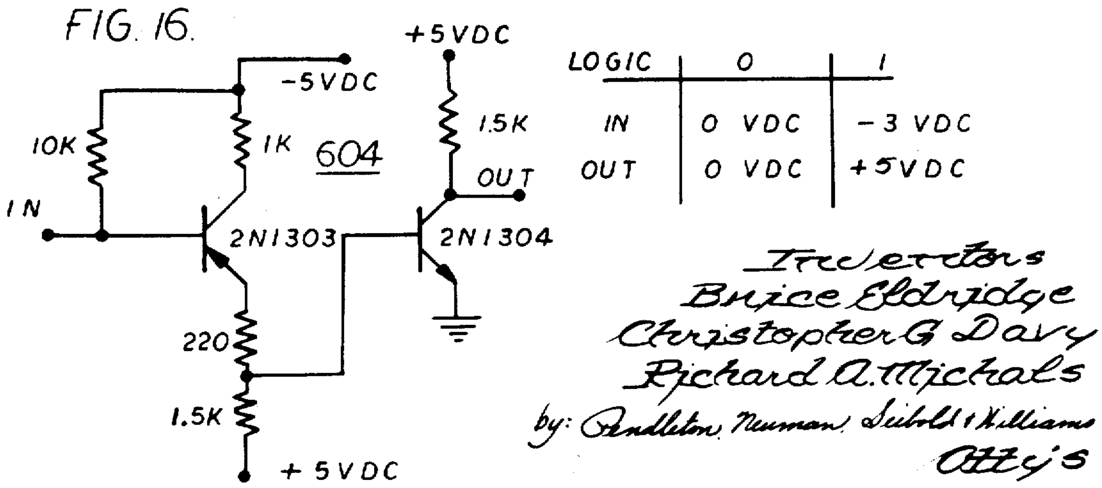

Gate 706 is normally held open by a high signal from the inverted output of level changer 604, shown in detail in FIG. 16. The inverted output of clock pulse one shot 24 is applied via driver gate and a suitable level changer 602 (shown in FIG. 15) to the input of integrating one shot 100. The output of one shot 100 is normally zero; the resulting output of level changer 604 is also zero. Thus the inverted output of level changer 604 is normally high, holding gate 706 open; thus a clock pulse from delay one shot 40 (FIG. 10A) sets flip-flop 106, applying a high level signal from the set output to NAND-gate 710. When no clock pulses are applied to the input of integrating one shot 100 for a period of 800 microseconds, its output as translated by level changer 604 is high. The high signal output, together with the concurrent high signals from the set outputs of Sequence Latches 112 and 106, are combined by NAND-gate 710 to reset flip-flop 112, closing NAND-gate 712 which connects the Error Latch 116 to the Write Word Count. Closing gate 712 before the count in the Write Word Count reaches four prevents the setting of Error Latch 116 and allows continued data processing. The high outputs from the normal output of level changer 604 and the reset output of flip-flop 112 are combined by NAND-gate 714 to reset flip-flop 106, preparing it to monitor the next data byte output sequence.

If flip-flop 112 is not reset before the occurrence of the fourth Write Pulse as counted by the Write Word Count, then gate 712 remains open, and the signals from the reset outputs of flip-flops 108 and 109 (indicating a write word count of four), are combined by AND-gate 716 and applied via open NAND-gate 712 to the present input of Error Latch 116 setting the latch. The same output signal from gate 712 which sets the Error Latch is applied to a preset input for the first output of shift register 28 (FIG. 10A). Since the adopted input data convention specifies that the data bit at this output should be a logical zero, presetting the output at a logical one or high state indicates on the computer tape record the occurrence of an error in the preceding word.

The set output of Error Latch 116 is connected via inverter 718 to the reset inputs of flip-flops 418–422 of the Bit Count (FIG. 10A). These flip-flops are held in their reset state and forced to ignore all incoming clock pulses until Error Latch 116 is reset. Because the Bit Count 34 controls data transfer and write pulse generation, no write pulse commands are generated until good output data is again being developed by the data transfer device.

The set outputs of flip-flops 116 and 112 are combined by NAND-gate 720 to reset flip-flops 424, 426 of the Bit Count. This is necessary because the state of flip-flops 424 and 426 controls the writing of the dummy byte. Setting the Error Latch means the dummy byte has not occurred at the proper time; thus flip-flops 424, 425 must be artificially reset by the Error Detection circuitry to prevent writing a false byte. Also the reset output of Error Latch 116 controls AND-gate 463 which is connected to the clock input of dummy byte flip-flop 36. Thus flip-flop 36 can be set, allowing the issue of a word pulse to the IRG count, only if properly aligned output data is being transferred to and written on the output tape. If error is found, the Error Latch 116 is set, gate 721 closes, and no word pulses are issued to the IRG count until properly aligned output data is detected.

To reset the circuitry of the error section to detect the next good word of output data, First Sequence Latch 112 is reset by a low signal from NAND-gate 722 which combines the set outputs of flip-flops 116 and 112. The next output signal from integrating one shot 100 and its associated level changer 604 is presumed to precede the start of a good output data word; therefore, the level changer output signal is combined with the reset output signal of flip-flop 112 by NAND-gate 714, resetting the Error Latch 116 and restarting writing of output data.

Figure 14:
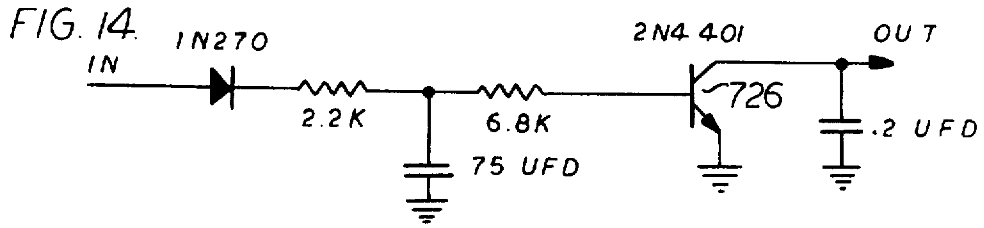
FIG. 14 depicts a delay circuit used in this invention and shown in FIG. 10D.

The set output of Motor Speed Control Latch 52 is connected to the reset inputs of Second Sequence Latch 106 and Error Latch 116 by means of a suitable delay device 102, shown in detail in FIG. 14.

The delay device has a period of about 500 milliseconds. With a logic one or high signal applied to the input, transistor 726 is off and the output signal is high. During the IRG period, the input to the delay circuit is zero, the 75 microfarad capacitor discharges, and the output is low or zero. When the IRG period terminates and flip-flop 52 is reset, the transistor does not turn on until the 75 microfarad capacitor is again charged. The time required to charge the capacitor and thus generate a high signal output is determined by the time constant of the RC network. In the embodiment disclosed this time constant is about 500 milliseconds.

Thus, when Motor Speed Latch 52 is set, causing a slow speed data input, the resulting low signal from delay circuit 102 inhibits the Alignment Error Detection Circuitry via driver gate 728. Delay Circuit 102 allows for the time lag required by playback 1 to resume normal speed after the end of recording the Inter-Record Gap by inhibiting the Error Detection Circuitry until high playback speed is resumed. Diodes 740–743 are used to provide the necessary connections for the action of this delay circuit, while preventing the gates and flip-flops from affecting each other.

The signal from the output of Delay Circuit 102 is also combined with the blank space indicating output (a high level) from integrating one shot 100 and level changer 604 by NAND-gate 730 to reset flip-flops 418 through 422 of the Bit Count (FIG. 10A) so that the count kept by the Data Bit Count of the deserialization circuit and the write word count of the Error Detection Circuit are coordinated.

While a particular embodiment of this invention is shown above and described, it will be understood, of course, that the invention is not to be limited thereto, since many modifications may be made. It is contemplated, therefore, by the appended claims, to cover any such modifications as fall within the true spirit and scope of this invention.

What is claimed is:

1. A data transfer system for converting input data, originating from a keyboard shorthand machine, from a form consisting of a plurality of intervals, each interval including a plurality of binary subintervals, to a form consisting of successive files, each file including a plurality of records, each of said records being separated from the succeeding record by an Inter-Record Gap, each record consisting of a plurality of words, each of said words including a plurality of bytes, each of said bytes consisting of a plurality of binary information bits, said data transfer system comprising:

a data input device for generating input data representing the phoenetic construction of words, parts of words or numerals, said data comprising a series of data intervals, each interval including a fixed number of binary subintervals, where each subinterval represents a character in the keyboard of said shorthand machine, a shift register coupled to said input device, said shift register having a capacity of one of said data bytes, means responsive to the data supplied to said shift register for counting the number of data bits supplied by said input device to said shift register, means responsive to said counting means for generating a signal indicating that said shift register has accumulated a data byte, an output device, means coupled between said shift register and said output device for transferring said accumulated data byte from said shift register to said output device, and write pulse counting means for generating a data write pulse substantially simultaneously with the transfer of said data byte to said output device, said output device being responsive to said data write pulse to accept a data byte transferred from said shift register.

2. A data transfer system as claimed in claim 1 wherein said data input device includes a clock pulse generating means responsive to said input data for generating internal system clock pulses, said data bit counting means being coupled to said clock pulse generating means and responsive to said clock pulse output so that the sequence of operation of the transfer system is controlled by the rate of data input.

3. The data transfer system claimed in claim 1 further including a second shift register coupled between said data input device and said output device, and means responsive to said data bit counting means for selectively applying said input data to said first or second shift register.

4. The data transfer system claimed in claim 3 wherein said transferring means includes first and second transfer gates, said first transfer gate being coupled between said first shift register and said output device and being responsive to said data bit counting means to transfer a data byte from said first shift register to said output device, said second transfer gate being coupled between said second shift register and said output device and being responsive to said data bit counting means to inhibit the transfer of a data byte from said second shift register to said output device substantially simultaneously with the transfer of a data byte from said first shift register.

5. The data transfer system as claimed in claim 1 wherein the data output device is an incremental tape recorder.

6. A data transfer system as claimed in claim 1 further including means coupled to said data write pulse generating means for counting and monitoring the number of words of output data transferred to said output device, means coupled to said monitoring means for generating a signal indicating that a predetermined number of words have been transferred, and Inter-Record Gap means responsive to said signal generating means for sending an Inter-Record Gap command signal when said predetermined number of words have been transferred, whereby a sequence for recording said Inter-Record Gap at said output device is initiated.

7. A data transfer system as claimed in claim 6 further including means responsive to said Inter-Record Gap command signal for inhibiting the transfer of a data byte from said shift register to said output device during said Inter-Record Gap recording sequence.

8. A data transfer system as claimed in claim 7 further including a second shift register, means for selectively applying said input data to said first or second shift register, a second storage register coupled to said second shift register for storing a data byte accumulated by said second shift register during said Inter-Record Gap sequence, first computing means coupled to said write pulse generating means, for maintaining a count of the number of data bytes stored during the recording of said Inter-Record Gap, second data transfer means coupled between said storage registers and said output device and responsive to the count in said first computing means for transferring the data bytes stored during the Inter-Record Gap recording sequence to the output device, second computing means for counting the number of data bytes transferred from said storage registers to said output device, and logic means coupled to said first and second computing means and to said Inter-Record Gap means for returning said data transfer device to normal operation following the recording of the data bytes stored during the Inter-Record Gap recording sequence.

9. A data transfer system as claimed in claim 6 further including a data rate input control device, said device controlling the rate at which input data is supplied to said data transfer system including a data rate flip-flop coupled to said data input device, said input device operating at a slow speed in response to a slow-down signal from said data rate flip-flop, and logic circuit means coupled between said output data word monitoring means and said data rate flip-flop for triggering said flip-flop to generate said slow-down signal when the number of words of output data transferred to said output device is approximately 95 percent of the number of words in a record.

* * * * *